US012306675B2

(12) United States Patent
Goh et al.

(10) Patent No.: US 12,306,675 B2
(45) Date of Patent: May 20, 2025

(54) SYSTEM AND METHOD OF MANUFACTURE FOR REPLACEABLE ICON AND SPEAKER MODULE WITH ANIMATED TOUCH-ACTUATED ICONS

(71) Applicant: Dell Products, LP, Round Rock, TX (US)

(72) Inventors: Peng Lip Goh, Singapore (SG); Weijong Sheu, Austin, TX (US); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 27 days.

(21) Appl. No.: 18/384,490

(22) Filed: Oct. 27, 2023

(65) Prior Publication Data

US 2025/0138589 A1     May 1, 2025

(51) Int. Cl.
    *G06K 9/00*          (2022.01)
    *G06F 1/16*           (2006.01)

(52) U.S. Cl.
    CPC .......... *G06F 1/1658* (2013.01); *G06F 1/1688* (2013.01)

(58) Field of Classification Search
    CPC ....... G06F 3/0202; G06F 1/1688; G06F 3/033
    See application file for complete search history.

(56) References Cited

U.S. PATENT DOCUMENTS

| | | | |
|---|---|---|---|
| 9,851,809 B2 | 12/2017 | LaFave | |
| 11,029,843 B2 | 6/2021 | Forlines | |
| 11,237,598 B2 | 2/2022 | Seibert | |
| 2014/0268628 A1* | 9/2014 | Mann | ..................... G08C 17/02 361/752 |
| 2021/0255762 A1 | 8/2021 | Jitkoff | |
| 2022/0164152 A1 | 5/2022 | Sepulveda | |

FOREIGN PATENT DOCUMENTS

WO      2008/002040 A1     1/2008

\* cited by examiner

*Primary Examiner* — Abbas I Abdulselam
(74) *Attorney, Agent, or Firm* — Prol Intellectual Property Law, PLLC; H. Kenneth Prol

(57) ABSTRACT

A base chassis assembly for an information handling system allowing user replacement of touch-actuated icons and speaker comprises a base chassis top cover joined to a base chassis bottom cover to form the base chassis assembly housing a motherboard, and having an opening for receiving a replaceable icon and speaker module to be operatively coupled to the motherboard. The replaceable icon and speaker module including plural acrylic layers forming an icon panel including a touch icon zone with icons formed from etching light prism arrays in the plural acrylic layer bottom surfaces for refracting colored light from a light emitting diode (LED) side-mounted at a determined angle from each acrylic layer to illuminate the icons, and a capacitive sense circuit board for detecting user touch at the touch icon zone, and an associated user input, based upon identification of the illuminated icon.

20 Claims, 16 Drawing Sheets

PERSPECTIVE VIEW

PERSPECTIVE VIEW

SYSTEM AND METHOD OF MANUFACTURE FOR REPLACEABLE ICON AND SPEAKER MODULE WITH ANIMATED TOUCH-ACTUATED ICONS

FIELD OF THE DISCLOSURE

The present disclosure generally relates to assembly of a base chassis for an information handling system incorporating a replaceable icon and speaker module. More specifically, the present disclosure relates to the use of a modular housing for animated touch-actuated icons that may be removed and replaced by a user without replacing a laptop motherboard and without separating a base chassis upper cover and lower cover, which may cause cracking or destruction of various chassis or hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more input keys or input icons, as well as one or more speakers incorporated within a base chassis that may also include a keyboard and touchpad, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
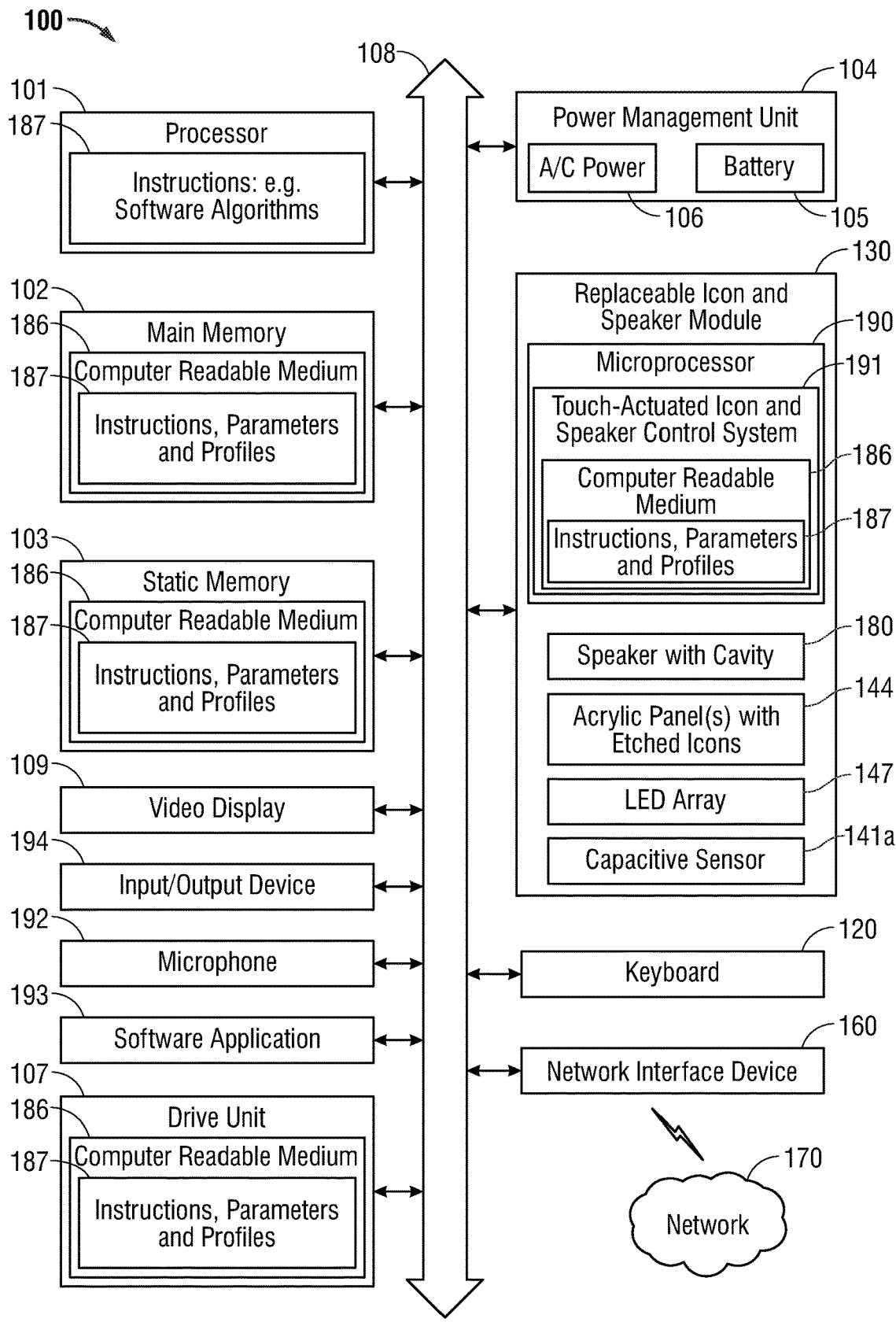
FIG. 1 is a block diagram illustrating a mobile information handling system operatively coupled to a replaceable icon and speaker module according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems, such as notebook, tablet, and laptop computers may include a display chassis housing the video display screen, and a base chassis housing a keyboard, touchpad, and various internal components necessary for operation of the information handling system, such as processors, memory, buses, and network interface devices, for example. The base chassis for such information handling systems may include a top cover where the keyboard and touchpad may be situated and accessible by the user, and a bottom portion that mates with the top cover to enclose the various operational components (e.g., processor, memory, etc.). For example, such a base chassis may enclose or at least partially house one or more speakers for audio output of the information handling system and one or more function keys icons representing various functionalities or indicators of software applications executing or available for execution at the information handling system. More specifically, such icons may indicate, for example, volume levels, display light levels, or status of microphones or cameras for recording the user's voice or image.

In existing systems, these icons and speakers are usually placed within the base chassis surrounding the keyboard and touchpad/palm rest, or as part of the keyboard in a limited space. Further, these icons in existing systems often represent a single action, status, or functionality. For example, such existing systems often have one icon indicating an active speaker, microphone, or camera and another icon indicating inactive speakers, microphone, or camera. In other words, two different statuses for a single feature (e.g., speaker) may occupy two icons within a limited area or the base chassis top cover. Further, because this area is so limited, and the format and location of each of these icons or function keys are set during the manufacturing process, there is little to no ability to add new functionality icons or for the user to choose which icons to include or exclude. A system is needed that provides a single visible icon that can change or animate to indicate a changed status (e.g., microphone on or microphone off) in order to save space, continues to provide existing speaker functionality, and allows users to choose which icons to include or exclude.

The replaceable icon and speaker module in embodiments of the present disclosure address this issue by providing a replaceable module that incorporates a variety of animated icons, each capable of showing multiple statuses of a single software or hardware feature of the information handling system. Such a replaceable module in embodiments of the present disclosure may also provide a piezoelectric actuator speaker and a speaker air volume sound cavity for enhancing sound output for the information handling system. The replaceable icon and speaker module in embodiments may be modular, such that the replaceable icon and speaker module can be removed, switched, or replaced by another module with other user-chosen icons, without separating the base chassis bottom cover from the base chassis top cover, which may damage the chassis and various internal components, and without having to replace the motherboard of the information handling system.

The icons of the replaceable icon and speaker module in embodiments may be animated in that the icon visible in any given touch icon zone of an icon panel on the top surface of the replaceable icon and speaker module may change in shape or color based on user input or based on functionality selected or indicators of software applications executing at the information handling system. For example, one touch icon zone of the icon panel in embodiments may display a plurality of icons indicating a status of the microphone for the information handling system, including one icon (in white light) in the shape of a microphone indicating an available ability of a currently executing software application to record the user's voice. A second icon of the same shape (e.g., in green light) indicates that the software application is currently recording the user's voice. A third icon (e.g., in red light) in the shape of a microphone with a line crossed through it at the same icon location indicates that the software application is not currently recording the user's voice. All three of these icons or other example icons in embodiments may be visible to the user within the same space of the icon panel for the replaceable icon and speaker module based on the current status of the microphone, giving a sense of animation of the icons. Because the replaceable icon and speaker module is replaceable, the user may choose which icons to make available by selecting a module with any given combination of user-selected icons and easily replacing the replaceable icon and speaker module according to embodiments of the present disclosure.

In order to display each of a plurality of icons within the same space of the icon panel in such a way, the replaceable icon and speaker module in embodiments of the present disclosure may include a plurality of vertically stacked acrylic panels, with each acrylic panel capable of routing visible light of a specific color from a nearby side-mounted LED of that color. In other words, in the example described directly above, the replaceable icon and speaker module would include plural (e.g., three) vertically stacked acrylic panels-a first for routing white light toward the icon panel on the top surface of the replaceable icon and speaker module, a second for routing green light toward the icon panel, and a third for routing red light toward the icon panel. Each of these vertically stacked acrylic panels in embodiments may include arrays of light prisms etched into their bottom surfaces having refractive indexes for refracting light of a specific color (e.g., white, green, or red) from the nearby side-mounted LEDs. Such arrays of light prisms may be etched to have the shape of a different icon. For example, one panel may have an array of light prisms having a refractive index for refracting white light upward, and this array may be in the shape of a microphone. As another example, a second panel may have an array of light prisms having a refractive index for refracting green light upward, and may also be in the shape of a microphone. As yet another example, a third panel may have an array of light prisms having a refractive index for refracting red light upward, and may be in the shape of a microphone with a line through it. In such an example embodiment, these three panels may be vertically stacked within the replaceable icon and speaker module with LEDs of each specific color at a side and under each specific panel such that only one of these icons may be visible within the same specific touch icon zone of the icon panel at a given time, depending on the status of the microphone, giving the icon an appearance of being animated or changeable with changing status of the microphone of the surface of the replaceable icon and speaker module.

In embodiments, these animated icons may also be touch-actuated to allow the user to change the status of the icon-representing feature through touch of the animated icon. In embodiments, the replaceable icon and speaker module may include a capacitive sense circuit board capable of detecting a user touch within a specific touch icon zone of the icon panel (e.g., associated with a known feature such as a microphone) on the top surface of the replaceable icon and speaker module. Upon identifying user touch in a given icon panel touch icon zone, a microprocessor of the capacitive sense circuit board executing code instructions of a touch-actuated icon and speaker control system may determine which of the plurality of available icons of varying colors was visible to the user at the time of the touch in order to determine a user input indicated by such touch. For example, if a user touch of a white icon in the shape of a microphone (indicating availability of a software application to record a user's voice) is sensed, the microprocessor may associate such a user touch with a user input to activate the microphone. As another example, if a user touch of a green icon in the shape of a microphone (indicating that the microphone is currently active and recording) is sensed, the microprocessor may associate such a user touch with a user input to deactivate the microphone. As yet another example, if a user touch of a red icon in the shape of a microphone with a line through it (indicating that the microphone is currently inactive or muted) is sensed, the microprocessor may associate such a user touch with a user input to reactivate the microphone and resume recording. The microprocessor for the capacitive sense circuit board in embodiments may transmit such determined user input to the processor for the information handling system for execution within a software application (e.g., activate microphone, deactivate microphone, reactivate microphone).

In other aspects of the present disclosure, the microprocessor of the capacitive sense circuit board may execute code instructions of the touch-actuated icon and speaker control system to change which of the plurality of icons is visible to the user via the icon panel, based on received user input or upon instructions received from a software application executing at the processor for the information handling system. For example, upon determining user input to activate the microphone, as described directly above, the microprocessor of the capacitive sense circuit board may execute code instructions of the touch-actuated icon and speaker control system to make the green icon in the shape of a microphone visible to the user at the icon panel, instead of the white icon in the shape of a microphone that the user touched, in order to indicate that the microphone is now active. In another example, upon determining user input to deactivate the microphone, as described directly above, the microprocessor of the capacitive sense circuit board may execute code instructions of the touch-actuated icon and speaker control system to make the red icon in the shape of a microphone with a line through it visible to the user at the icon panel, instead of the green icon in the shape of a microphone that the user touched, in order to indicate that the microphone is now muted or deactivated. In still another example, upon determining user input to reactivate the microphone, as described directly above, the microprocessor of the capacitive sense circuit board may execute code instructions of the touch-actuated icon and speaker control system to make the green icon in the shape of a microphone visible to the user at the icon panel, instead of the red icon in the shape of a microphone with a line through it that the user touched, in order to indicate that the microphone has been unmuted or reactivated. Any number of panels are contemplated to provide any number of animated icons in a given touch icon zone on the replaceable icon and speaker module in various embodiments.

In addition to the possible user inputs determined by the microprocessor of the capacitive sense circuit board described above, the processor of the information handling system may also transmit icon command instructions for making a different icon visible to the user via control of various LED colors or no LED light. For example, upon startup of a software application with the ability to record sound or images of the user, such as a videoconferencing application, the processor may transmit an icon command instruction to the capacitive sense circuit board to make the white icon in the shape of the microphone visible to the user in order to indicate ability to record the user's voice within a current videoconferencing session. As another example, where a software application is not currently executing to record the user's voice or process such recordings, the processor may transmit an icon command instruction to the microprocessor of the capacitive sense circuit board to make none of the icons associated with the microphone feature visible to the user. Upon execution of such an icon command instruction (or determined user input) to make none of the icons within a specific touch icon zone of the icon panel visible to the user, the microprocessor may deactivate all LEDs associated with that touch icon zone, such that that portion of the icon panel appears identical to the surrounding base chassis top cover, with no visible icons. In such a way, the replaceable icon and speaker module in embodiments of the present disclosure may provide a single visible icon that can change or animate to indicate a changed status of a feature (e.g., microphone on or microphone off) in order to save space, continue to provide existing speaker functionality, and allow users to choose which icons to include or exclude.

FIG. 1 illustrates an information handling system 100 according to several aspects of the present disclosure. In various embodiments described herein, a replaceable icon and speaker module 130 operating a touch-actuated icon and speaker control system 191 may be operatively connected to the information handling system 100 such that the replaceable icon and speaker module 130 may be removable and replaceable with respect to the information handling system 100. This may allow for replacement of the replaceable icon and speaker module without separating a base chassis upper and lower cover housing various internal components (e.g., 101, 102, 108, 140, 120, 160, 104) of the information handling system and without replacing a motherboard incorporating, at least, the processor 102 while prolonging the life of the information handling system 100. As described herein, the replaceable icon and speaker module 130 in an embodiment may provide a single visible icon within a given touch icon zone of an icon panel visible to the user that can change or animate to indicate a changed status of a feature of a software application 193 executing at the hardware processor 101 (e.g., microphone on or microphone off) or provide a functional touch location in order to save space, as well as continue to provide existing speaker functionality, and allow users to choose which icons to include or exclude. The replaceable icon and speaker module 130 in an embodiment may provide a piezoelectric actuator speaker 180 with a speaker air volume sound cavity for enhancing sound output for the information handling system 100. The replaceable icon and speaker module 130 in embodiments may be modular, such that the replaceable icon and speaker module can be removed, switched, or replaced by another module with other user-chosen icons, without separating the base chassis bottom cover from the base chassis top cover, which may damage the chassis and various internal components, and without having to replace the motherboard or hardware processor 101 of the information handling system 100.

The icons of the replaceable icon and speaker module in an embodiment may be animated in that the icon visible in any given touch icon zone of an icon panel on the top surface of the replaceable icon and speaker module 130 may change in shape or color based on user input or based on functionality of software applications executing at the hardware processor 101 of the information handling system 100. For example, one touch icon zone of the icon panel in embodiments may display a plurality of icons indicating a status of the microphone 192 for the information handling system 100, including one icon (e.g., in which light) in the shape of a microphone indicating ability of a currently executing software application 193 to record the user's voice, a second icon of the same shape (e.g., in green light) indicating that the software application 193 is currently recording the user's voice, and a third icon (e.g., in red light) in the shape of a microphone with a line crossed through it indicating that the software application 193 is not currently recording the user's voice. All three of these icons or other example icons in embodiments may be visible to the user within the same space of the icon panel for the replaceable icon and speaker module 130 based on the current status of the microphone 192, giving a sense of animation of the icons. Multiple sets of icons, each set with any number of animation or color options, are contemplated at plural touch icon zones of the surface cover of the replaceable icon and speaker module 130. Because the replaceable icon and speaker module 130 is replaceable, the user may choose which icons to make visible by selecting a module 130 with any given combination of user-selected icons.

In order to display each of a plurality of icons within the same space or touch icon zone of the icon panel for the replaceable icon and speaker module 130 in such a way, the replaceable icon and speaker module 130 in an embodiment may include a plurality of vertically stacked acrylic panels 144, with each acrylic panel 144 capable of routing visible light of a specific color from a nearby side-mounted LED or an LED array 147 of that color and plural colors. Each of these vertically stacked acrylic panels 144 in embodiments may include arrays of light prisms etched into their bottom surfaces having refractive indexes for refracting light of a specific color (e.g., white, green, or red) from the nearby side-mounted LEDs 147 of these colors mounted to shine underneath each respective acrylic panel 144. These visible icons may also be touch-actuated to allow the user to change the status of the icon-representing feature of the software application 193 through touch of the animated icon. In an embodiment, the replaceable icon and speaker module 130 may include a capacitive sense circuit board capable of detecting a user touch through a capacitive sensor 141a within a specific region or touch icon zone of the icon panel (e.g., associated with a known feature such as a microphone) on the top surface of the replaceable icon and speaker module 130. Such a capacitive sensor 141a in an embodiment may include, for example, one or more capacitive touch detector layers for sensing a user touch within a specific region or touch icon zone of the icon panel for the replaceable icon and speaker module 130, as described in greater detail herein.

Upon identifying user touch in a given touch icon zone or an icon panel region, a microprocessor 190 of the capacitive sense circuit board executing code instructions 187 of a touch-actuated icon and speaker control system 191 may determine which of the plurality of available icons of varying colors was visible to the user at the time of the touch in order to determine a user input indicated by such touch. The microprocessor 190 for the capacitive sense circuit board in embodiments may transmit such determined user input to the hardware processor 101 for the information handling system 100 for execution within a software application 193 (e.g., activate microphone, deactivate microphone, reactivate microphone). The microprocessor 190 of the capacitive sense circuit board in an embodiment may also execute code instructions 187 of the touch-actuated icon and speaker control system 191 to change which of the plurality of icons is visible to the user via the icon panel, based on received user input or upon instructions received from a software application 193 executing at the hardware processor 101 for the information handling system 100. The hardware processor 101 of the information handling system 100 may also transmit icon command instructions for making a different icon visible to the user. For example, upon startup of a software application 193 with the ability to record sound or images of the user, such as a videoconferencing application, the hardware processor 101 may transmit an icon command instruction to the microprocessor 190 to make a white icon in the shape of the microphone visible to the user in order to indicate ability to record the user's voice within a current videoconferencing session of software application 193. As another example, where a software application 193 is not currently executing to record the user's voice or process such recordings, the hardware processor 101 may transmit an icon command instruction to the microprocessor 190 to make none of the icons associated with the microphone feature visible to the user. Upon execution of such an icon command instruction (or determined user input) to make none of the icons within a specific region or touch icon zone of the icon panel visible on the surface to the user, the microprocessor 190 may deactivate all LEDs 147 associated with that region or touch icon zone, such that that portion of the icon panel appears identical to the surrounding base chassis top cover, with no visible icons.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, input/output device 194, keyboard 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the touch-actuated icon and speaker control system 191, the wireless network interface device 160, a static memory 103 or drive unit 107, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. For example, the hardware processor 101 in an embodiment may execute code instructions 187 of the touch-actuated icon and speaker control system 191 to operate a piezoelectric actuator speaker 180 and a plurality of variously-colored and lit touch-actuated icons of the replaceable icon and speaker module 130 via microprocessor 190. In some embodiments, it is understood any or all portions of code instructions 187 may operate on a plurality of information handling systems 100.

The replaceable icon and speaker module 130 may include a microprocessor 190 such as a microcontroller unit (MCU) capable of operating speaker 180, LED array 147, and capacitive sensor 141a or other components. For example, the microprocessor 190 may be capable of sensing a user touch of one or more touch-actuated icons of the replaceable icon and speaker module 130, and transmitting an indication of such a sensed user touch to the hardware processor 101 via bus 108. The hardware processor 101 of the information handling system 100 in an embodiment may execute code instructions of a software application 193 to generate an icon command for transmission to the MCU 190 for controlling the operation of the LED array 147a based upon such received indications of user touch of the icons, or based on received input from a software application 193 executing at the processor 101. In an embodiment, the hardware processor 101 may transmit such an icon command to the MCU 190 to cause one or more LEDs in one or more LED arrays (e.g., 147a) of various colors to emit light, lighting one or more touch-actuated icons under selected acrylic panels 144 for the user to view in a specific color, or to cease to emit light, making those icons non-visible to the user. The hardware processor 101 may also transmit speaker commands and data to the microprocessor 190 to operate the speaker 180.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. In some embodiments, the hardware processor 101 may be operatively coupled to a motherboard of the information handling system. Any of the hardware processing resources may operate to execute code instructions that are either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as the replaceable icon and speaker module 130, any combination of various input and output (I/O) devices 194, the keyboard 120, or the like.

The network interface device 160 may provide connectivity of the information handling system 100 to the network 170 via a network AP in an embodiment. The network 170 in some embodiments may be a wired local area network (LAN), a wireless personal area network (WPAN) such as Bluetooth® capabilities for communication with peripheral devices, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the replaceable icon and speaker modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
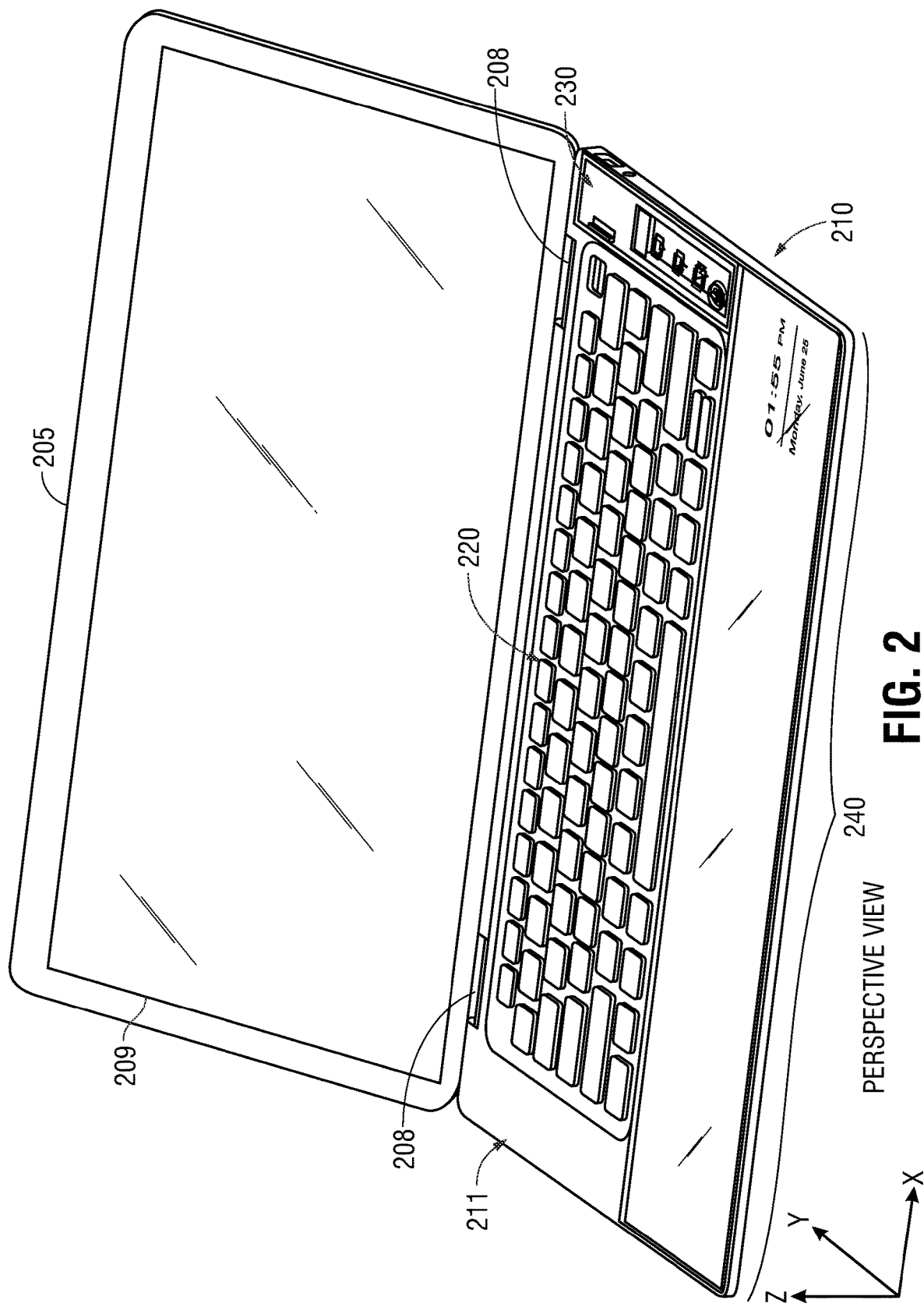
FIG. 2 is a graphical diagram illustrating perspective view of a base chassis of a mobile information handling system including a replaceable icon and speaker module according to an embodiment of the present disclosure.

FIG. 2 is a graphical diagram illustrating a perspective view of a base chassis for a mobile information handling system incorporating a removable icon and speaker module according to an embodiment of the present disclosure. A base chassis top cover 211 may be formed in an embodiment with openings for a keyboard 220, and a replaceable icon and speaker module 230. In an embodiment, the replaceable icon and speaker module 230 may be removable and replaceable without separating the base chassis top cover 211 from the base chassis bottom cover 210 and without replacing the motherboard for the mobile information handling system.

The base chassis top cover 211 may be joined to a base chassis bottom cover 210 in an embodiment, to form a mobile information handling system base chassis. In an embodiment, such a base chassis may also be operatively connected, via one or more hinges 208 to a mobile information handling system display chassis 205 housing a digital display 209. The replaceable icon and speaker module 230 top surface (e.g., icon panel of FIGS. 4A, 4B, and 4C of a top acrylic panel described in greater detail below with respect to FIGS. 5A, 5B, and 5C) may be flush with the top surface of the base chassis top cover 211 in an embodiment upon insertion of the replaceable icon and speaker module 230 within the top cover chassis opening sized to receive the replaceable icon and speaker module 230. The replaceable icon and speaker module 230 in an embodiment may be placed between the keyboard 220 and a side wall of the base chassis bottom cover 210.

Figure 3A:
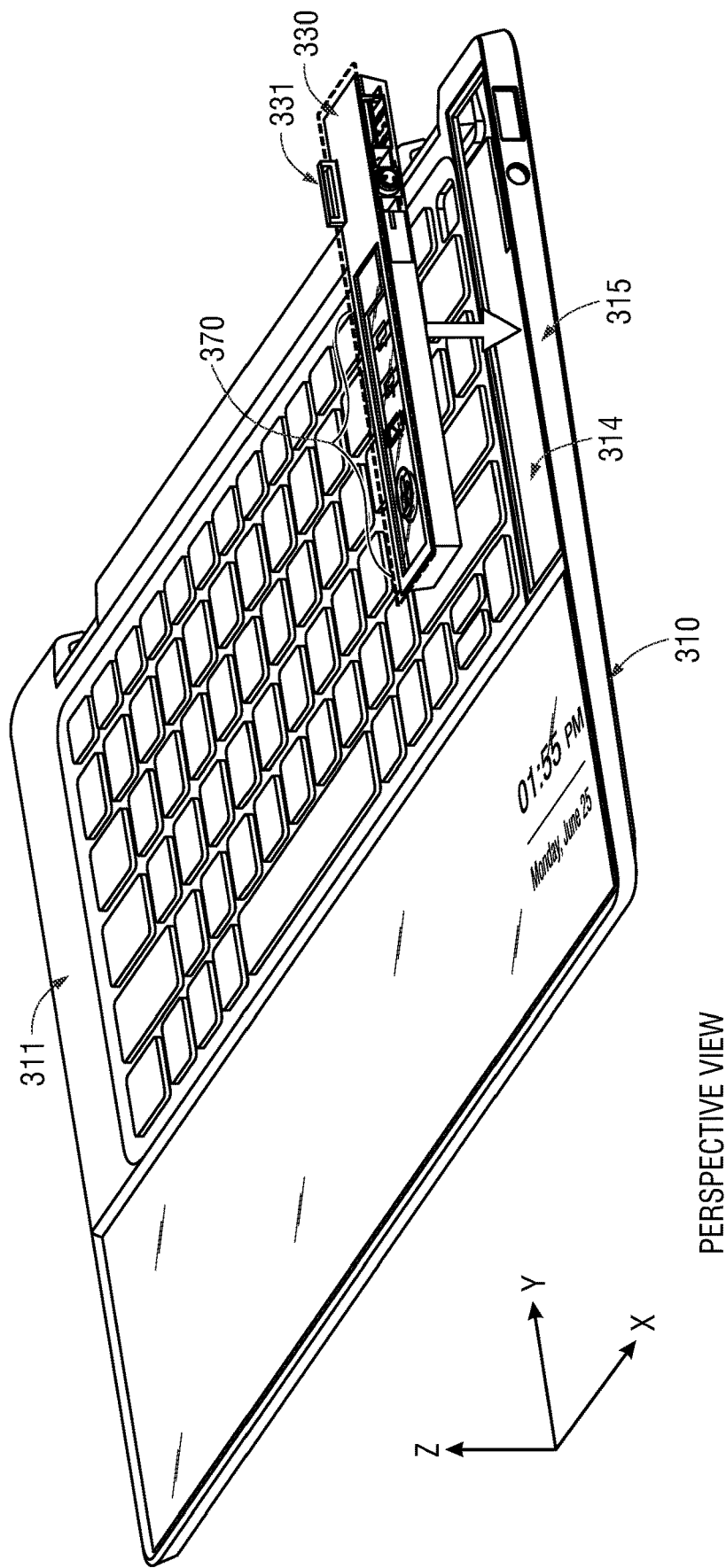
FIG. 3A is a graphical diagram illustrating a perspective view of a mobile information handling system base chassis including an opening for insertion and removal of a replaceable icon and speaker module according to an embodiment of the present disclosure.

FIG. 3A is a graphical diagram illustrating a perspective view of a mobile information handling system base chassis including an opening for insertion and removal of a replaceable icon and speaker module operating a touch-actuated icon and speaker system according to an embodiment of the present disclosure. As described herein, the replaceable icon and speaker module in an embodiment may house one or more layers and touch icon zones for touch-actuated icons generated with light emitting diodes (LEDs), such as of various colored lights, and a piezoelectric actuator speaker with a speaker air volume sound cavity. This replaceable icon and speaker module may be removed and replaced within the base chassis of the mobile information handling system without separating the base chassis top cover from the base chassis bottom cover, and without replacement of the mobile information handling system motherboard or damage to other components.

A base chassis bottom cover 310 may be formed in an embodiment with side walls 315. The base chassis top cover 311 in an embodiment may be formed with a top cover chassis opening 314 sized to receive the replaceable icon and speaker module 330. The replaceable icon and speaker module 330 in an embodiment may be removed from or inserted into the top cover chassis opening 314 for the replaceable icon and speaker module 330 for installation into the base chassis bottom cover 310. The connector module push/pull tab 331 located on the top surface of the replaceable icon and speaker module 330 may be pulled by a user to remove the replaceable icon and speaker module 330 from the mobile information handling system top cover chassis opening 314 in an embodiment.

The replaceable icon and speaker module 330 may include an icon panel 370 with a plurality of touch-actuated icons in touch icon zones with one or more colors visible to the user, where plural icons are etched into one or more vertically stacked acrylic panels of the replaceable icon and speaker module 330 in an embodiment. A capacitive sense circuit board of the replaceable icon and speaker module 330 may sense user touch of one or more of the touch-actuated icons at each touch icon zone within the icon panel 370 in an embodiment on the top surface panel, which may be a top acrylic panel of the replaceable icon and speaker module 330. The icons may appear non-visible to the user in the absence of LED light or may each appear with activation of a side LED corresponding to each stacked acrylic layer.

Figure 3B:
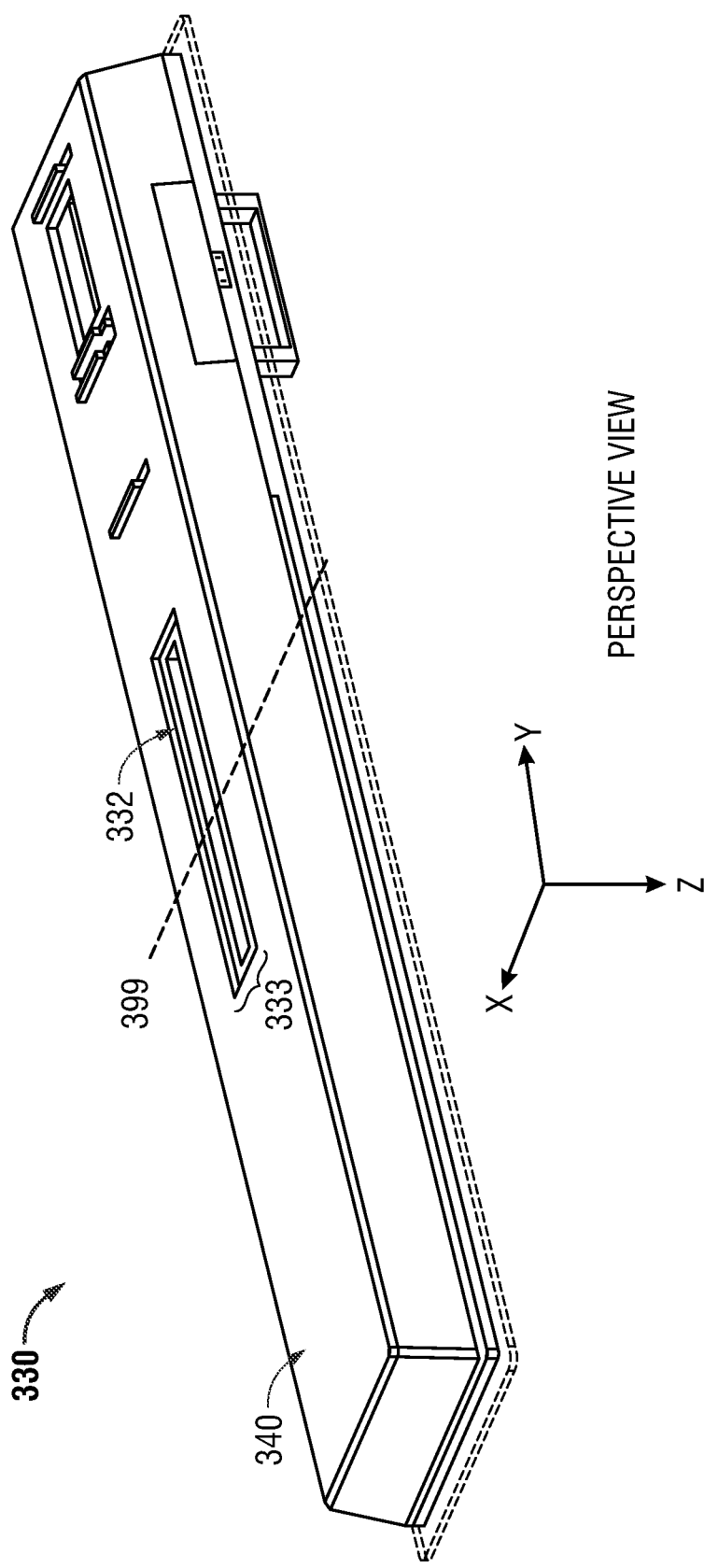
FIG. 3B is a graphical diagram illustrating a perspective view of the bottom side of a replaceable icon and speaker module according to an embodiment of the present disclosure.

FIG. 3B is a graphical diagram illustrating a perspective view of the bottom side of a replaceable icon and speaker module for insertion within a mobile information handling system base chassis according to an embodiment of the present disclosure. As described herein, a replaceable icon and speaker module 330 in an embodiment may be removed and replaced within the base chassis of the mobile information handling system without replacing the motherboard or damaging other components because the replaceable icon and speaker module 330 may include a connector 332 that mates with the motherboard for the mobile information handling system upon insertion of the replaceable icon and speaker module 330 within the base chassis. A replaceable icon and speaker module housing tray 340 may be formed in an embodiment to include an opening 333 for a motherboard-sided module connector to mate with a module-sided motherboard connector 332 disposed in the opening 333. An icon and speaker module circuit board may be fixed in an embodiment within the replaceable icon and speaker module housing tray 340 such that the module-sided motherboard connector 332 is partially disposed through the motherboard-sided module connector opening 333. The module-sided motherboard connector 332 may mate with a motherboard-sided module connector of the mobile information handling system, such as mounted on a motherboard and disposed in the opening 314 in the base chassis to receive the replaceable icon and speaker module 330. The motherboard-sided module connector may be received in the motherboard-sided module connector opening 333 within the replaceable icon and speaker module housing 340 in an embodiment. FIG. 3D below illustrates a cross-sectional view of the replaceable icon and speaker module 330 from a vertical plane cut out along line 399.

Figure 3C:
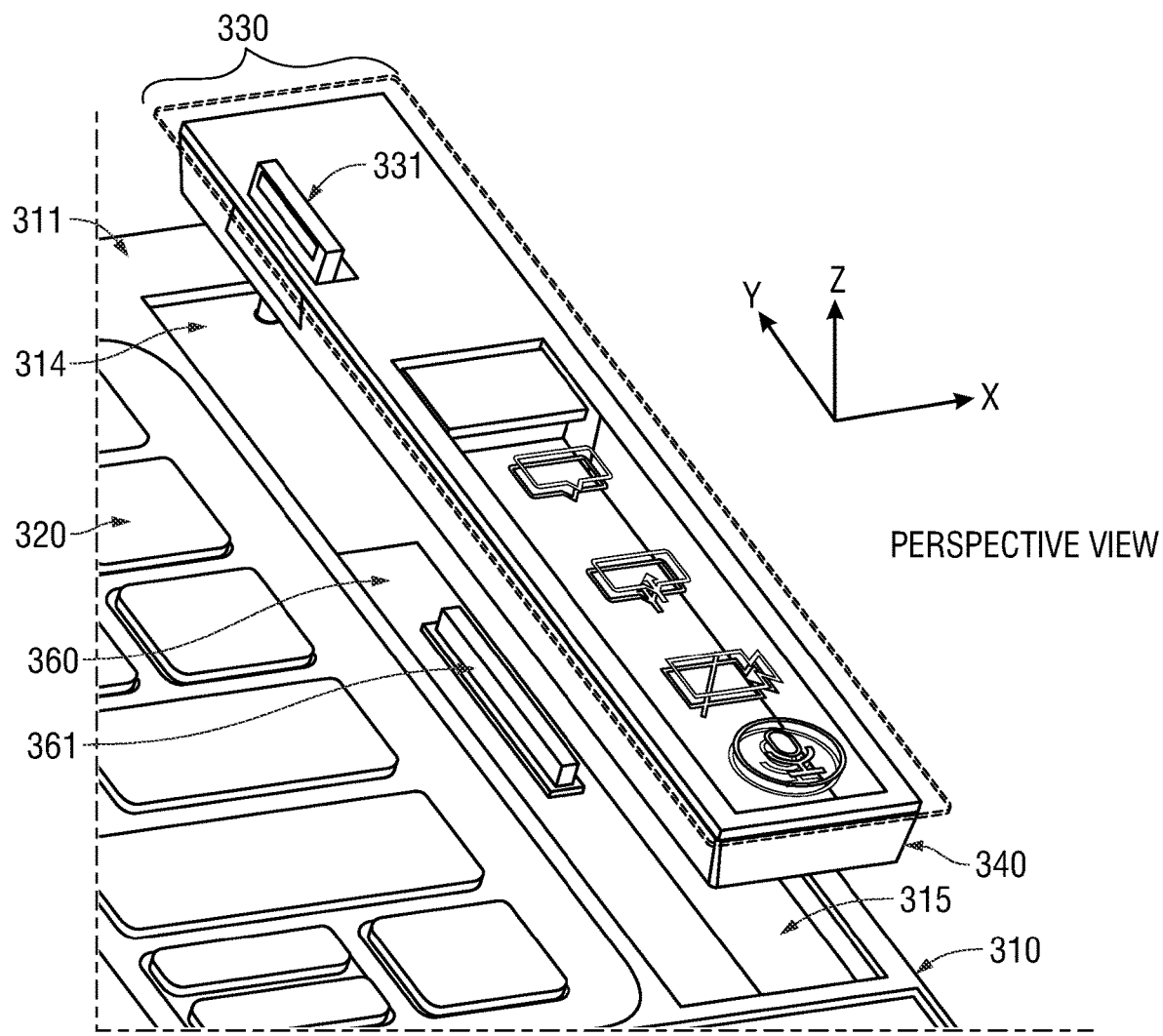
FIG. 3C is a graphical diagram illustrating a perspective view of a replaceable icon and speaker module for mating with a motherboard housed within a mobile information handling system base chassis according to an embodiment of the present disclosure.
Figure 3D:
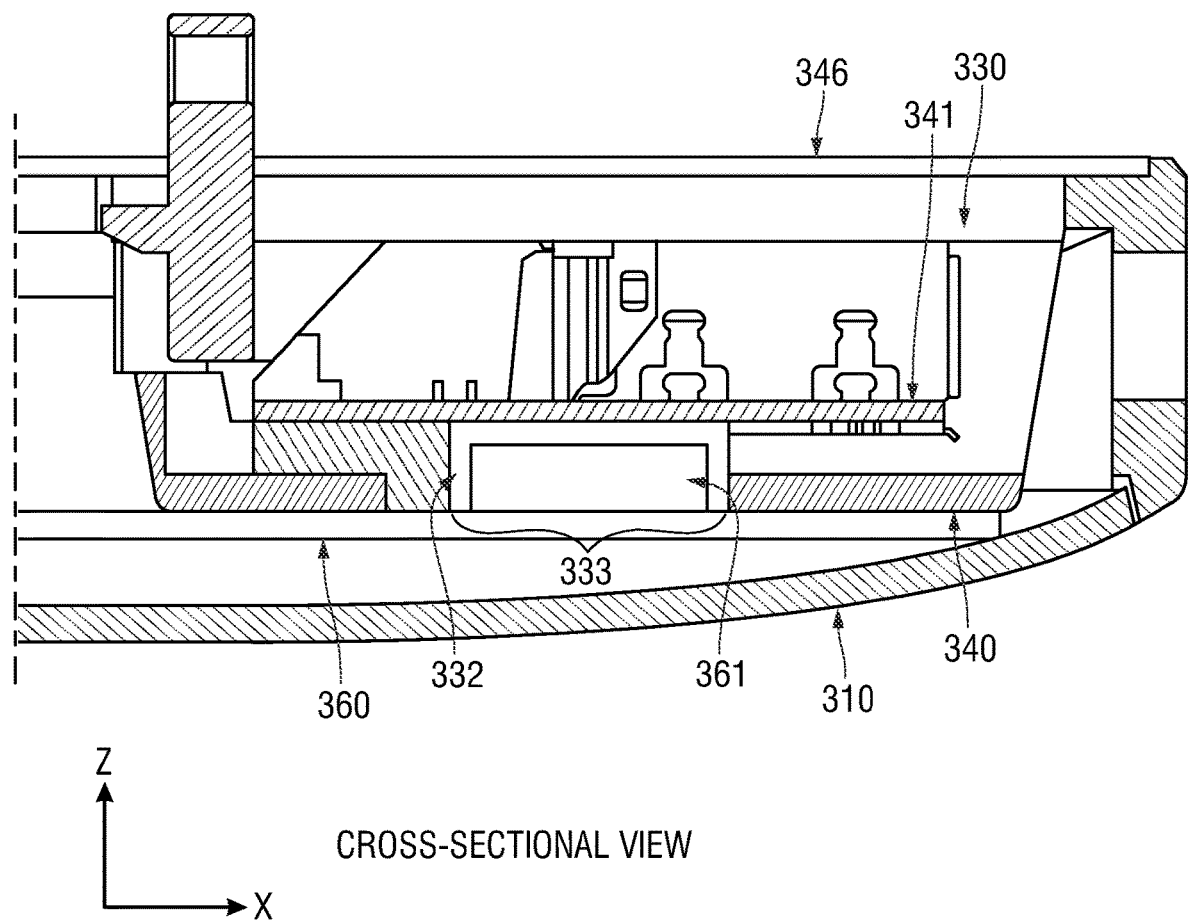
FIG. 3D is a graphical diagram illustrating a cross-sectional view of a replaceable icon and speaker module for mating with a motherboard housed within a mobile information handling system base chassis according to an embodiment of the present disclosure.

FIG. 3C is a graphical diagram illustrating a perspective view of a replaceable icon and speaker module for mating with a motherboard housed via a motherboard-sided module connector within a mobile information handling system base chassis according to an embodiment of the present disclosure. As described herein, a replaceable icon and speaker module 330 in an embodiment may be removed and replaced within an opening 314 in the base chassis bottom cover 310 of the mobile information handling system sized to receive it without replacing the motherboard 360 because the replaceable icon and speaker module 330 may include a connector that mates with the motherboard-sided module connector 361 disposed in opening 314 upon insertion of the replaceable icon and speaker module 330 within the base chassis bottom cover 310.

A base chassis bottom cover 310 with side walls 315 may be formed in an embodiment. In an embodiment, a base chassis top cover 311 may be formed with an opening 314 in it and the base chassis bottom cover 310 for receiving a replaceable icon and speaker module 330 beside another chassis section for keyboard 320. A replaceable icon and speaker module housing 340 may be formed in an embodiment to include an opening underneath (not shown) for receiving a motherboard-sided module connector 361 to mate with a module-sided motherboard connected disposed therein. A motherboard 360 including a processor for the information handling system and a motherboard-sided module connector 361 may be inserted within the base chassis bottom cover 310 in an embodiment. The replaceable icon and speaker module 330 with a push/pull tab 331 may be inserted within the base chassis top cover opening 314 beside the bottom cover side wall 315 and operatively coupled to the motherboard 360 via the motherboard-sided module connector 361.

A module-sided motherboard connector (shown in FIG. 3B at 332 on the bottom surface of the replaceable icon and speaker module 330) may be partially disposed through a motherboard-sided module connector opening (shown in FIG. 3B at 333 on the bottom surface of the replaceable icon and speaker module 330) in the under-side of the replaceable icon and speaker module housing 340, and mates with the motherboard-sided module connector 361. The module-sided motherboard connector may be operatively connected in an embodiment to the microcontroller of a capacitive sense circuit board in the replaceable icon and speaker module housing 340. The replaceable icon and speaker module housing 340 in an embodiment may also house a capacitive sense circuit board operatively connected to a plurality of light emitting diode (LED) arrays, a capacitive sensor, and piezoelectric actuator speaker, a speaker air volume sound cavity, as well as the module-sided motherboard connector for mating with the motherboard-sided module connector 361. Such a mating with the motherboard-sided module connector 361 may operatively connect the microprocessor, the plurality of LED arrays, capacitive sensor, and piezoelectric actuator speaker housed within the replaceable icon and speaker module housing 340 to the motherboard 360 of the mobile information handling system.

FIG. 3D is a graphical diagram illustrating a cross-sectional view of a replaceable icon and speaker module operatively coupling with a motherboard housed within a mobile information handling system base chassis without separating the base chassis upper and bottom covers according to an embodiment of the present disclosure. A motherboard 360, including a processor for a mobile information handling system is disposed within the base chassis bottom cover 310 in an embodiment. A module-sided motherboard connector 332 disposed within motherboard-sided module connector opening 333 within the replaceable icon and speaker module housing 340 may mate with a motherboard-sided module connector 361. The replaceable icon and speaker module housing 340 may include a tray that may be joined to the connector module top acrylic panel 346 or other top surface layer to form the replaceable icon and speaker module 330 in an embodiment. Such a mating of the module-sided motherboard connector 332 with the motherboard-sided module connector 361 may operatively connect a microprocessor, mounted to a capacitive sense circuit board 341 and housed within the replaceable icon and speaker module housing 340, to the motherboard 360 of the mobile information handling system.

Figure 4A:
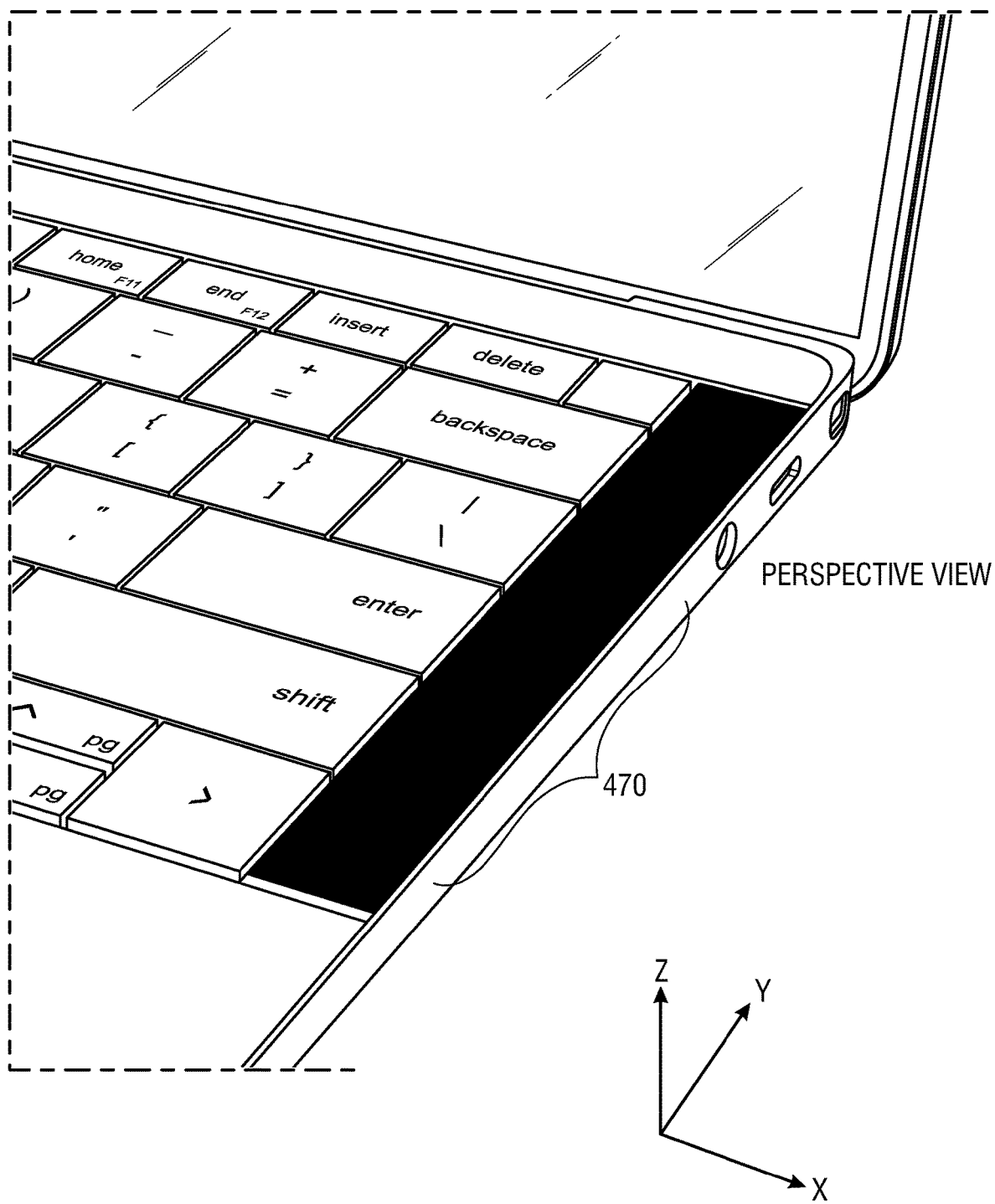
FIG. 4A is a graphical diagram illustrating a perspective view of a replaceable icon and speaker module having unlit icons according to an embodiment of the present disclosure.

FIG. 4A is a graphical diagram illustrating a perspective view of a replaceable icon and speaker module having unlit touch-actuated icons according to an embodiment of the present disclosure. As described in embodiments herein, the icons of the replaceable icon and speaker module in an embodiment may be animated in that an icon that would be visible in any given touch icon zone of an icon panel 470 on the top surface of the replaceable icon and speaker module may change in shape or color based on user input or based on functionality of software applications executing at the information handling system. As also described herein, where a software application is not currently executing to provide the functionality depicted by any of a given group of icons, the processor may transmit an icon command instruction to the microprocessor of the capacitive sense circuit board to make none of the icons associated with that feature visible to the user. Upon execution of such an icon command instruction (or determined user input) to make none of the icons within a specific touch icon zone of the icon panel 470 visible to the user, the microprocessor may deactivate any or all LEDs associated with that touch icon zone, such that that portion of the icon panel 470 appears identical to the surrounding base chassis top cover with no visible icons.

Figure 4B:
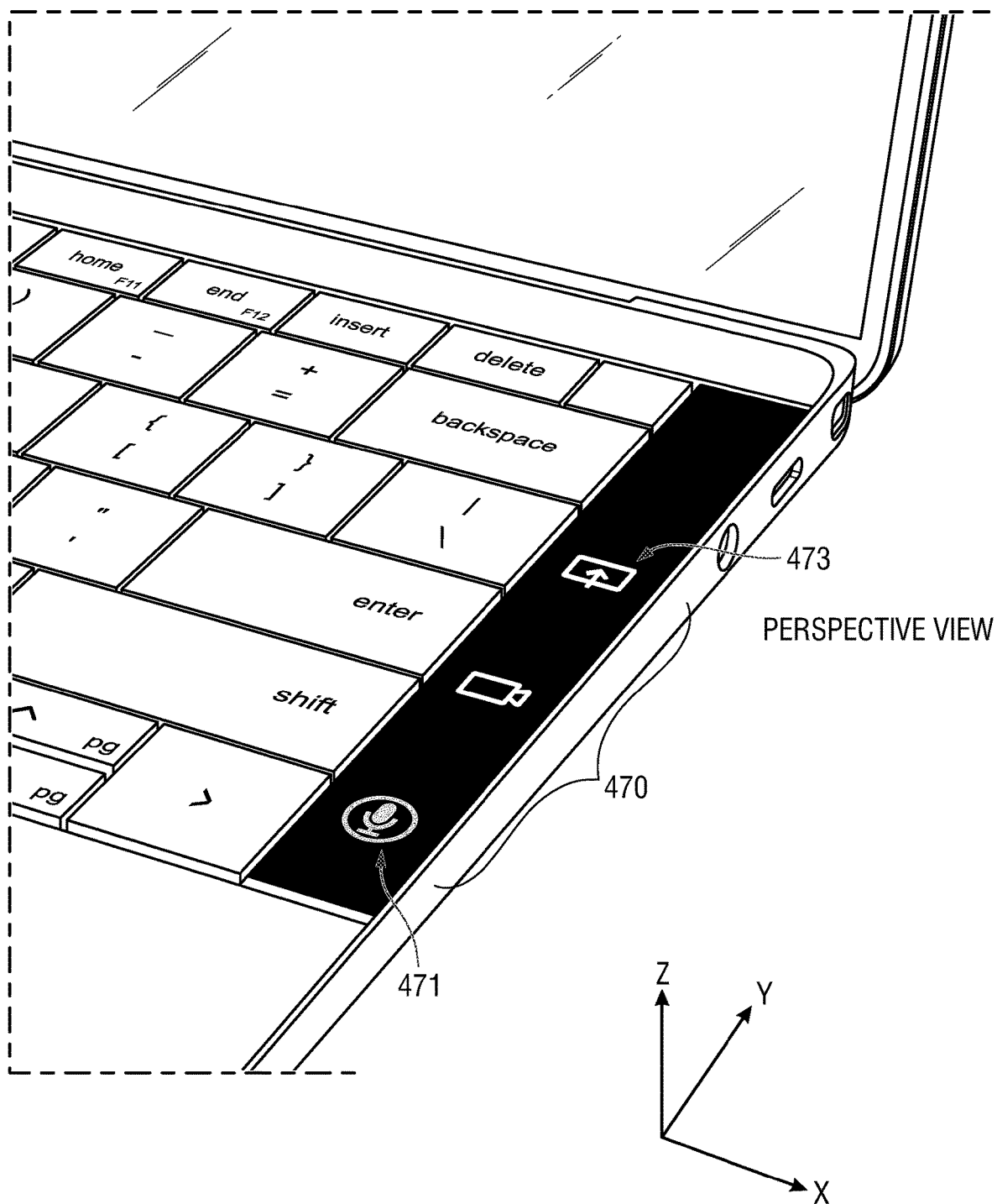
FIG. 4B is a graphical diagram illustrating a perspective view of a replaceable icon and speaker module having icons indicating an active or available software feature according to an embodiment of the present disclosure.

FIG. 4B is a graphical diagram illustrating a perspective view of a replaceable icon and speaker module having touch-actuated icons indicating active software features according to an embodiment of the present disclosure. As described herein, the icons of the replaceable icon and speaker module in an embodiment may be animated in that the icon visible in any given touch icon zone of an icon panel 470 on the top surface of the replaceable icon and speaker module may change in shape or color based on user input or based on functionality of software applications executing at the information handling system. For example, one touch icon zone 471 of the icon panel 470 in an embodiment may display a plurality of icons indicating a status of the microphone for the information handling system, including one icon (e.g., in white light) in the shape of a microphone indicating ability of a currently executing software application to record the user's voice, a second icon of the same shape (e.g., in green light as shown in FIG. 4B) indicating that the software application is currently recording the user's voice, and a third icon (e.g., in red light) in the shape of a microphone with a line crossed through it indicating that the software application is not currently recording the user's voice. All three of these icons or other example icons in embodiments may be visible to the user within the same space 471 of the icon panel for the replaceable icon and speaker module based on the current status of the microphone, giving a sense of animation of the icons. In another example, a touch icon zone 473 of the icon panel 470 in an embodiment may display a plurality of icons for status of downloads to the processor of the information handling system, including a first icon showing a box with an arrow pointing to it (e.g., in white light as shown in FIG. 4B) indicating availability of a download, a second icon of the same shape (e.g., in green light) indicating that a download is in progress, and a third icon showing a box with an arrow pointing to it and a line crossed through it (e.g., in red light) indicating a cancelled, incomplete, or unavailable download.

In another aspect of an embodiment, the processor of the information handling system may also transmit icon command instructions for making a different icon visible to the user. Upon receipt of such an icon command instruction, or upon determination that a touch-actuated user input has been received (as described in greater detail below with respect to FIG. 4C), requiring a change in visible icons, the microprocessor for the replaceable icon and speaker module may perform such a change of icon visibility. For example, upon startup of a software application with the ability to download files, such as a media player application, the processor may transmit an icon command instruction to the microprocessor to make the white icon in the shape of the box with an arrow pointed to it visible to the user via illumination of a white LED under a corresponding acrylic layer with the white download icon etched thereon in order to indicate ability to download a media file such as a video or audio file.

Figure 4C:
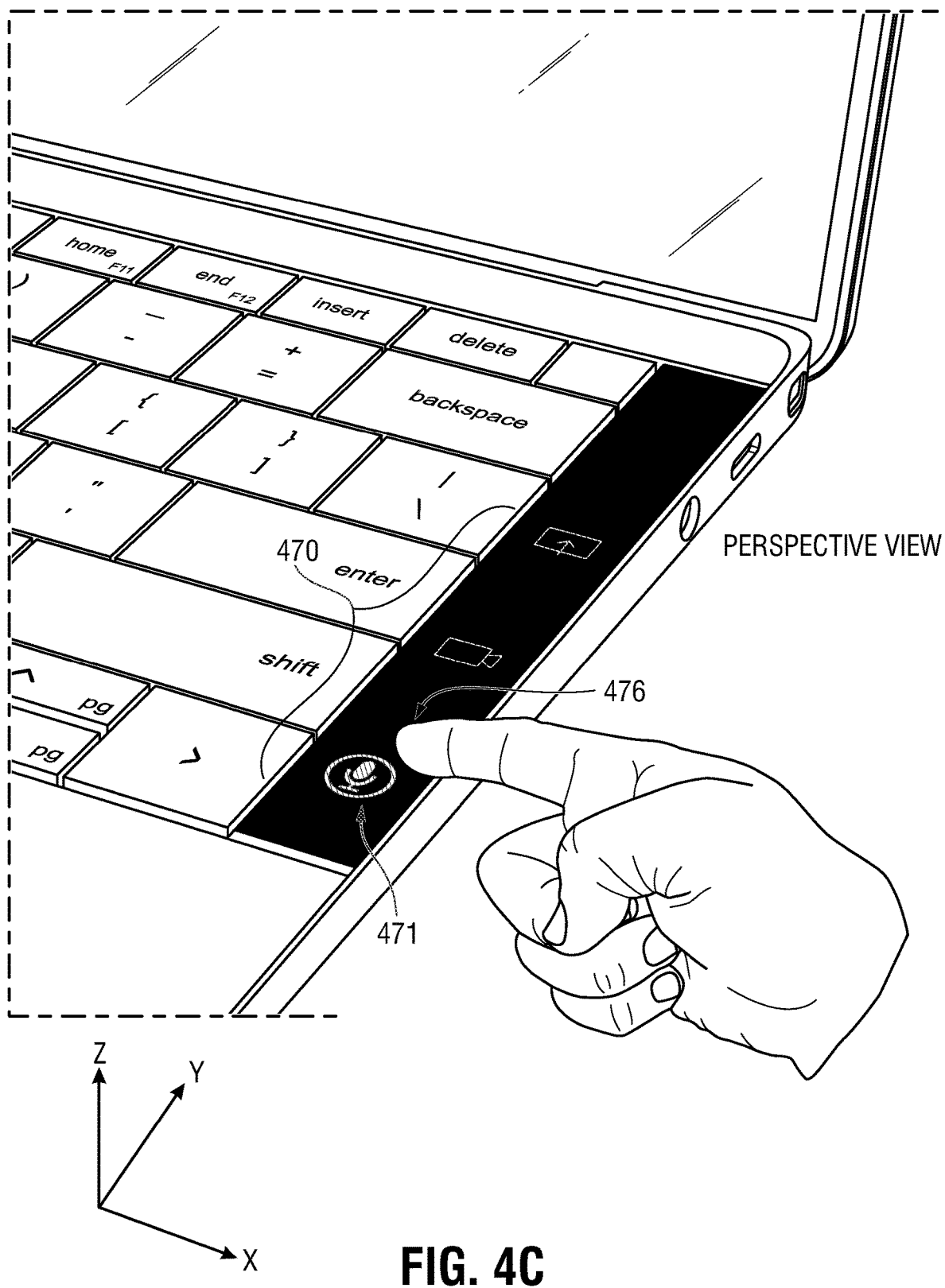
FIG. 4C is a graphical diagram illustrating a perspective view of a replaceable icon and speaker module having icons indicating inactive software features according to another embodiment of the present disclosure.

FIG. 4C is a graphical diagram illustrating a perspective view of a replaceable icon and speaker module having touch-actuated icons indicating inactive software features according to an embodiment of the present disclosure according to an embodiment of the present disclosure. As described herein, the icons of the replaceable icon and speaker module in an embodiment may be animated in that the icon visible in any given touch icon zone (e.g., 471) of an icon panel 470 on the top surface of the replaceable icon and speaker module may change in shape or color based on user input or based on functionality of software applications executing at the information handling system. For example, one touch icon zone 471 of the icon panel 470 in an embodiment may display a plurality of icons indicating a status of the microphone for the information handling system, including one icon (e.g., in white light) in the shape of a microphone indicating ability of a currently executing software application to record the user's voice, a second icon of the same shape (e.g., in green light) indicating that the software application is currently recording the user's voice, and a third icon (e.g., in red light as shown in FIG. 4B) in the shape of a microphone with a line crossed through it indicating that the software application is not currently recording the user's voice.

As also described herein, the icons displayed to the user via the icon panel 470 in an embodiment may also be touch-actuated to allow the user to change the status of the icon-representing feature through touch by a user 476 (e.g., a user's finger) of the animated icon, such as the microphone icon visible within touch icon zone 471. The replaceable icon and speaker module may include a capacitive sense circuit board capable of detecting a user touch 476 within a specific touch icon zone 471 of the icon panel 470 (e.g., associated with a known feature such as a microphone) on the top surface of the replaceable icon and speaker module via a capacitive touch sensor at specific touch icon zone 471. The capacitive touch sensor may be one or more capacitive touch sensor layers formed under or within the top surface. Upon identifying user touch 476 in a given icon panel touch icon zone 471, a microprocessor of the capacitive sense circuit board executing code instructions of a touch-actuated icon and speaker control system may determine which of the plurality of available icons of varying colors was visible to the user at the time of the touch (e.g., the red-lit microphone with a cross through it, as shown in FIG. 4C) based on which LED color is on or active in the touch icon zone 471 at the time of touch in order to determine a user input indicated by such user touch 476. For example, the user touch 476 of the red icon in the shape of a microphone with a line through it (indicating that the microphone is currently inactive or muted) is sensed in touch icon zone 471, the microprocessor may associate such a touch by a user 476 with a user input to reactivate the microphone and resume recording. The microprocessor for the capacitive sense circuit board in an embodiment may transmit such determined user input to the processor for the information handling system for execution within a software application (e.g., activate microphone, deactivate microphone, reactivate microphone).

Figure 5A:
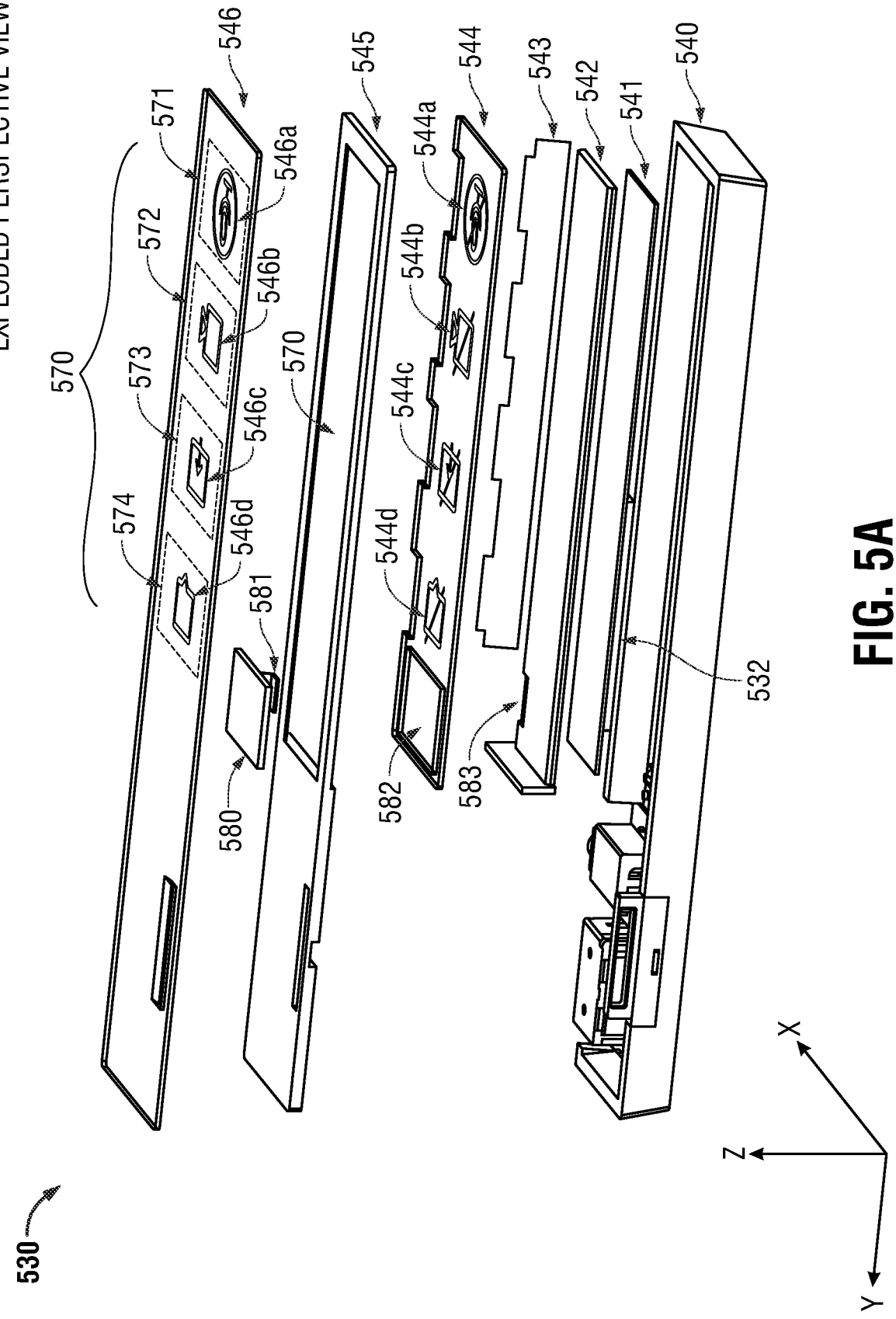
FIG. 5A is a graphical diagram illustrating an exploded perspective view of a replaceable icon and speaker module according to an embodiment of the present disclosure.

FIG. 5A is a graphical diagram illustrating an exploded perspective view of a replaceable icon and speaker module housing tray housing a capacitive sense circuit board, a plurality of LED arrays, a piezoelectric actuator speaker, and plural acrylic panels with etched icons according to an embodiment of the present disclosure. As described herein, the visible icons of the replaceable icon and speaker module 530 in an embodiment may be animated in that the icon visible in any given touch icon zone of an icon panel 570 on the top surface of the replaceable icon and speaker module 530 may change in shape or color based on user input or based on functionality of software applications executing at the information handling system. For example, one touch icon zone (e.g., 571) of the icon panel 570 in an embodiment may be capable of displaying a plurality of icons (e.g., 546a or 544a) indicating a status of the microphone for the information handling system. In an example embodiment, such a single touch icon zone 571 of the icon panel 570 may include one icon 546a in the shape of a microphone indicating that a currently executing software application is recording the user's voice, or a second icon 544a in the shape of a microphone with a line crossed through it indicating that the software application is not currently recording the user's voice. Each of these icons 546a or 544a or other example icons (e.g., 544b, 544c, 544d, 546b, 546c, or 546d) in an embodiment may be visible to the user within the same corresponding touch icon zone of the icon panel (e.g., 571, 572, 573, or 574, respectively) for the replaceable icon and speaker module 530 based on the current status of the microphone, giving a sense of animation of the icons. Because the replaceable icon and speaker module 530 is replaceable, the user may choose which icons to make visible by selecting a replaceable icon and speaker module 530 with any given combination of user-selected icons.

In order to display each of a plurality of icons (e.g., 544a and 546a) within the same touch icon zone (e.g., 571) of the icon panel 570 in such a way, the replaceable icon and speaker module 530 in an embodiment may include a plurality of vertically stacked acrylic panels 546 and 544, with each acrylic panel capable of routing visible light of a specific color from a nearby side-mounted LED from LED circuit panel 543 of that color. Each vertically stacked acrylic panel 544 and 546 in an embodiment may be capable of causing icons of a single color to become visible to the user in each touch icon zone 571, 572, 573, and 574. Thus, the replaceable icon and speaker module 530 shown in FIG. 5A may be capable of displaying icons of two different colors (e.g., red and green). In other embodiments, other or additional colors may be available by increasing the number of vertically stacked acrylic panels included within the replaceable icon and speaker module 530.

Each of these vertically stacked acrylic panels 544 and 546 in an embodiment may include arrays of light prisms etched into their bottom surfaces in the shapes of various icons 544a, 544b, 544c, 544d, 546a, 546b, 546c, and 546d. For example, the top acrylic panel 546 in an embodiment may include a first array of light prisms for icon 546a etched into the icon shape of a microphone, a second array of light prisms for icon 546b etched into the icon shape of a camera, a third array of light prisms for icon 546c etched into the icon shape of a box with an arrow pointing to it, and a fourth array of light prisms for icon 546d etched into the icon shape of a chat box. As another example, the bottom acrylic panel 544 in an embodiment may include a first array of light prisms for icon 544a etched into the icon shape of a microphone with a line through it, a second array of light prisms for icon 544b etched into the icon shape of a camera with a line through it, a third array of light prisms for icon 544c etched into the icon shape of a box with an arrow pointing to it and a line through both the box and the arrow, and a fourth array of light prisms for icon 544d etched into the icon shape of a chat box with a line through it.

Each of the arrays of light prisms on a given acrylic panel in an embodiment may have refractive indexes for refracting light of a specific color from nearby side-mounted LEDs. For example, each of the arrays of light prisms for icons 546a, 546b, 546c, and 546d etched into the top acrylic panel 546 in an embodiment may have refractive indexes for refracting light of a first color (e.g., green light) from nearby side-mounted green LEDs under top acrylic panel 546 and for each touch icon zone 571, 572, 573, and 574. As another example, each of the arrays of light prisms for icons 544a, 544b, 544c, and 544d etched into the bottom acrylic panel 544 in an embodiment may have refractive indexes for refracting a second light color (e.g., red light) from nearby side-mounted red LEDs under bottom acrylic panel 544 and for each of the touch icon zones 571, 572, 573, and 574. In an embodiment, one of a plurality of different arrays of light prisms (e.g., for icons 546a and 544a) etched in the shapes of multiple icons (e.g., for a microphone and a microphone with a line crossed through it) may reflect light upward to the icon panel 570 at one time in a touch icon zone (e.g., 571). This may make one of the two icons (e.g., a microphone 546a or a microphone with a line crossed through it 544a) visible to the user via the icon panel 570 at any given time, based on which of the LEDs and which color (e.g., green or red) are active at that time.

In embodiments, these animated icons may also be touch-actuated to allow the user to change the status of the icon-representing feature through touch of a touch sensing layer at each touch icon zone 571, 572, 573, and 574 of an animated icons. In an embodiment, the replaceable icon and speaker module may include a capacitive sense circuit board 541 capable of detecting a user touch within a specific touch icon zone (e.g., 571, 572, 573, or 574) of the icon panel 570 on the top acrylic panel 546 of the replaceable icon and speaker module 530. The capacitive sense circuit board 541 in an embodiment may be inserted within a replaceable icon and speaker module housing tray 540 and may be operatively connected to one or more capacitive touch sensing layers at touch icon zones 571, 572, 573, or 574 and to a module-sided motherboard connector 532. In an embodiment, the module-sided motherboard connector 532 may be inserted through the module-sided motherboard connector opening (e.g., shown as 333 in FIG. 3B) in the replaceable icon and speaker module housing tray 540. The capacitive sense circuit board 541 in an embodiment may be inserted within the replaceable icon and speaker module housing tray 540 parallel to the housing tray floor and at any level within the speaker air volume sound cavity of the replaceable icon and speaker module housing tray 540. A capacitive sense circuit cover 542 may be inserted over and parallel to the capacitive sense circuit board 541 in an embodiment.

The bottom acrylic panel 544 may be inserted parallel to the floor of the replaceable icon and speaker module housing tray 540 within the replaceable icon and speaker module 530 above the capacitive sense circuit 541. A spacer layer 545 of an opaque material may be inserted above and parallel to the bottom acrylic panel 544 in an embodiment and may frame out the icon panel 570. This spacer layer 545 may provide an air gap between the top acrylic panel 546 and the bottom acrylic panel 546 to prevent inadvertent bleed through of light emitted from LEDs mounted to the LED circuit board 543. The spacer layer 545 and the capacitive sense circuit cover or another layer may also have light partition in an embodiment between touch icon zones 571, 572, 573, and 574 to shield adjacent, side-mounted LEDs from reaching adjacent etched prisms. However, the etched prisms of each icon are also formed to only refract light of one of these side-mounted LEDs when light is provided at a particularized angle and thus other LED light is shielded in such a way from between the etched prisms as adjacent LED lights are at a wrong angle. A piezoelectric actuator speaker 580 in an embodiment may be operatively connected to the module-sided motherboard connector 532, via the electrical connector 581, and inserted into the icon and speaker opening 570 in the spacer layer 545 and the speaker opening 582 in the bottom acrylic panel 544 to the speaker air volume sound cavity below. This may operatively connect the speaker 580 to the processor of the information handling system via the motherboard-sided module connector (e.g., as described in greater detail above with respect to FIG. 3D). In some embodiments, a piezoelectric actuator speaker may be operatively coupled through the capacitive sense circuit 541 and any micro controller thereon. The electrical connector 581 in an embodiment may be wrapped around a notch 583 of the capacitive sense circuit cover 542 to operatively connect the piezoelectric actuator speaker 580, which may be disposed above the capacitive sense circuit cover 542 to the module-sided motherboard connector 532 and optionally to the capacitive sense circuit board 541, which may be disposed below the capacitive sense circuit cover 542. A top acrylic panel 546 may be inserted parallel to the bottom acrylic panel 544, above the spacer layer 545. This top acrylic panel 546 may be bonded or adhered to the icon and speaker module housing tray 540 to form the top surface of the icon and speaker module 530, and to enclose air for reverberation of portions of the piezoelectric actuator speaker within the speaker air volume sound cavity therein to cause sound to be emitted.

Upon identifying user touch from a capacitive touch sensor layer formed in a given icon panel touch icon zone (e.g., 571), a microprocessor of the capacitive sense circuit board 541 executing code instructions of a touch-actuated icon and speaker control system may determine which of the plurality of available icons (e.g., 544a or 546a) of varying colors was visible to the user due to which side-mounted LED was illuminated at the time of the touch in order to determine a user input indicated by such touch. For example, if a user touch of icon 546a emitting green light in the shape of a microphone (indicating that the microphone is currently active and recording) is sensed, the microprocessor may associate such a user touch with a user input to deactivate the microphone. In another example, if a user touch of icon 544a emitting red light in the shape of a microphone with a line through it (indicating that the microphone is currently inactive or muted) is sensed, the microprocessor may associate such a user touch with a user input to reactivate the microphone and resume recording. The microprocessor for the capacitive sense circuit board in embodiments may transmit such determined user input to the processor for the information handling system for execution within a software application (e.g., activate microphone, deactivate microphone, reactivate microphone) via the module-sided motherboard connector 532.

Figure 5B:
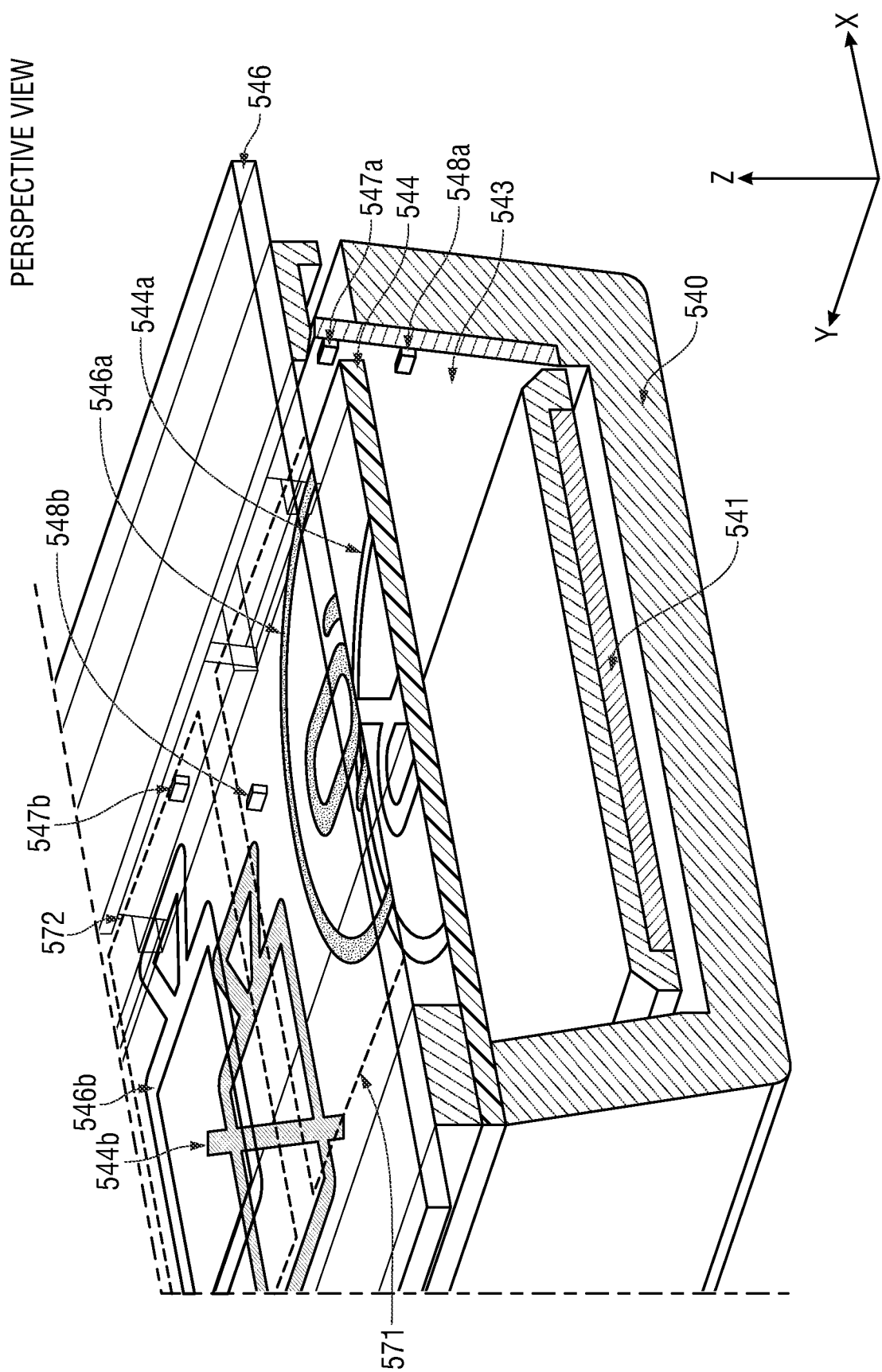
FIG. 5B is a graphical diagram illustrating a perspective cut-away view of a replaceable icon and speaker module housing tray housing a plurality of LED arrays for emitting light through top and bottom acrylic panels and a speaker air volume sound cavity according to an embodiment of the present disclosure.

FIG. 5B is a graphical diagram illustrating a cut-away perspective view of a replaceable icon and speaker module housing tray housing a capacitive sense circuit board, and a plurality of LEDs in an LED array circuit panel for emitting light directed at the underside of the top and bottom acrylic panels with etched icons according to an embodiment of the present disclosure. As described herein, in order to display each of a plurality of icons (e.g., 544a and 546a) within the same touch icon zone (e.g., 571) of the icon panel, the replaceable icon and speaker module housing tray 540 in an embodiment may house a plurality of vertically stacked acrylic panels (e.g., 546 and 544), with each acrylic panel 546 and 544 capable of routing visible light of a specific color (e.g., green or red, respectively) from a nearby side-mounted LED of that color (e.g., 547a or 547b, each emitting green light, or 548a or 548b, each emitting red light) in the LED array circuit panel 543. Each vertically stacked acrylic panel 544 or 546 in an embodiment may be capable of causing icons of a single color (e.g., red or green, respectively) to become visible to the user due to the corresponding LED 547a, 547b, 548a, or 548b at a given touch icon zone 571 or 572. In other embodiments, additional colors may be available by increasing the number of vertically stacked acrylic panels and additional LEDs included within the replaceable icon and speaker module housing tray 540.

Each of these vertically stacked acrylic panels 544 and 546 in an embodiment may include arrays of light prisms etched into their bottom surfaces in the shapes of various icons 546a, 546b, 544a, and 544b. For example, the top acrylic panel 546 in an embodiment may include a first array of light prisms for icon 546a etched into the icon shape of a microphone and a second array of light prisms for icon 546b etched into the icon shape of a camera, and the bottom acrylic panel 544 may include a first array of light prisms for icon 544a etched into the icon shape of a microphone with a line through it, and a second array of light prisms for icon 544b etched into the icon shape of a camera with a line through it. Because these acrylic panels and their etched icons may be stacked vertically with respect to the floor of the replaceable icon and speaker housing tray 540 in an embodiment, one animated icon (e.g., 546a and 544a) from each of the acrylic panels (e.g., 546 and 544, respectively) may be associated with a single touch icon zone (e.g., 571) of the top acrylic panel 546 in which human touch may be sensed via a capacitive touch sensing layer in the icon zone at the top acrylic panel 546 by the capacitive sense circuit board 541.

Each of the arrays of light prisms 546a and 544a on a given acrylic panel 546 and 544 in an embodiment may have refractive indexes for refracting light of a specific color (e.g., green and red, respectively) and at a particular angle from the nearby side-mounted LEDs (e.g., 547a and 548a). For example, each of the arrays of light prisms for icons 546a, and 546b etched into the top acrylic panel 546 in an embodiment may have refractive indexes for refracting green light from nearby side-mounted green LEDs 547a and 547b. As another example, each of the arrays of light prisms for icons 544a, and 544b etched into the bottom acrylic panel 544 in an embodiment may have refractive indexes for refracting red light from nearby side-mounted red LEDs, 548a and 548b. In an embodiment, one of a plurality of different arrays of light prisms (e.g., for icons 546a and 544a) etched in the shapes of multiple icons (e.g., a microphone and a microphone with a line crossed through it) for a touch icon zone 571 may refract light upward to the icon panel 570 at one time. For example, either the array of light prisms forming icon 546a in the shape of the microphone or the array of light prisms forming icon 544a in the shape of the microphone with the line through it may refract light upward to the icon panel 570 at touch icon zone 571 at one time. This may be the case because only one of the LEDs from LED 547a or 548b is designed to emit light at a correct angle toward these stacked icons 544a and 546a at any given a time and from underneath the corresponding acrylic layer 546 or 544, respectively. More specifically, the green LED 547a may be turned on, while the red LED 548a is turned off, such that a green icon in the shape of a microphone icon 546a is visible at the icon panel 570 within touch icon zone 571. As another example, the red LED 548a may be turned on, while the green LED 547a is turned off, such that a red icon in the shape of a camera with a line through it is visible at the icon panel 570 within touch icon zone 572.

In embodiments, these animated icons at the touch icon zone 571 from icons 546a and 544a may also be touch-actuated to allow the user to change the status of the icon-representing feature through touch of the animated icon touch icon zone 571. Upon identifying user touch in a given icon panel touch icon zone (e.g., 571), a microprocessor of the capacitive sense circuit board 541 executing code instructions of a touch-actuated icon and speaker control system may determine which of the plurality of available icons 544a or 546a of varying colors (e.g., red or green, respectively) was visible to the user in the touch icon zone 571 at the time of the touch, in order to determine a user input indicated by such touch. For example, if a user touch of icon 546a emitting green light in the shape of a microphone, indicating that the microphone is currently active and recording, is sensed, the microprocessor may associate such a user touch with a user input to deactivate the microphone. In another example, if a user touch of an icon 544a emitting red light in the shape of a microphone with a line through it, indicating that the microphone is currently inactive or muted, is sensed, the microprocessor may associate such a user touch with a user input to reactivate the microphone and resume recording.

In addition to the possible user inputs determined by the microprocessor of the capacitive sense circuit board 541 described above, the processor of the information handling system may also transmit icon command instructions for changing which icon is visible to the user. For example, where the user has indicated a desire to mute the microphone, either through direct interface with a software application accessing the microphone (e.g., videoconferencing application), or through touch-actuation of the icon 546a at touch icon zone 571, the processor may transmit an icon command instruction to make the icon 544a visible instead of the icon 546a. In such a scenario, or upon detected user input, the microprocessor of the capacitive sense circuit board 541 may deactivate LED 547a, and activate LED 548a. This may make the green-lit icon 546a no longer visible to the user via icon panel 570, and may make the red-lit icon 544a visible to the user instead at touch icon zone 571. As another example, where the user has indicated a desire to turn on the camera, either through direct interface with a software application accessing the camera, such as a videoconferencing application, or through touch-actuation of the icon 544b at touch icon zone 572, the processor may transmit an icon command instruction to make the icon 546b visible instead of the icon 544b. In such a scenario, or upon detected user input, the microprocessor of the capacitive sense circuit board 541 may deactivate LED 548b, and activate LED 547b. This may make the red-lit icon 544b no longer visible to the user via icon panel 570 at touch icon zone 572, and may make the green-lit icon 546b visible to the user instead.

The angle of light from the LEDs 547a and 548a relative to 547b and 548b may be such that the etched prisms of icons 546a and 544a pass light only from LEDs 547a and 548a only and are not affected by LEDs 547b or 548b. Thus, cross-illumination between touch icon zones 571 and 572 does not occur due to the etched prism structure of each of the icons 546a, 544a, 546b, and 544b. In still another example, where a software application is not currently executing to record the user's voice or process such recordings, the processor may transmit an icon command instruction to the microprocessor of the capacitive sense circuit board 541 to make none of the icons 546a or 544a associated with the microphone feature visible to the user. Upon execution of such an icon command instruction (or determined user input) to make none of the icons 546a or 544a within a specific touch icon zone 571 of the icon panel 570 visible to the user, the microprocessor may deactivate all LEDs 547a and 548a associated with that touch icon zone 571 or those icons 546a or 544a, such that that at least a portion 571 of the icon panel 570 appears identical to the surrounding base chassis top cover, with no visible icons.

Figure 5C:
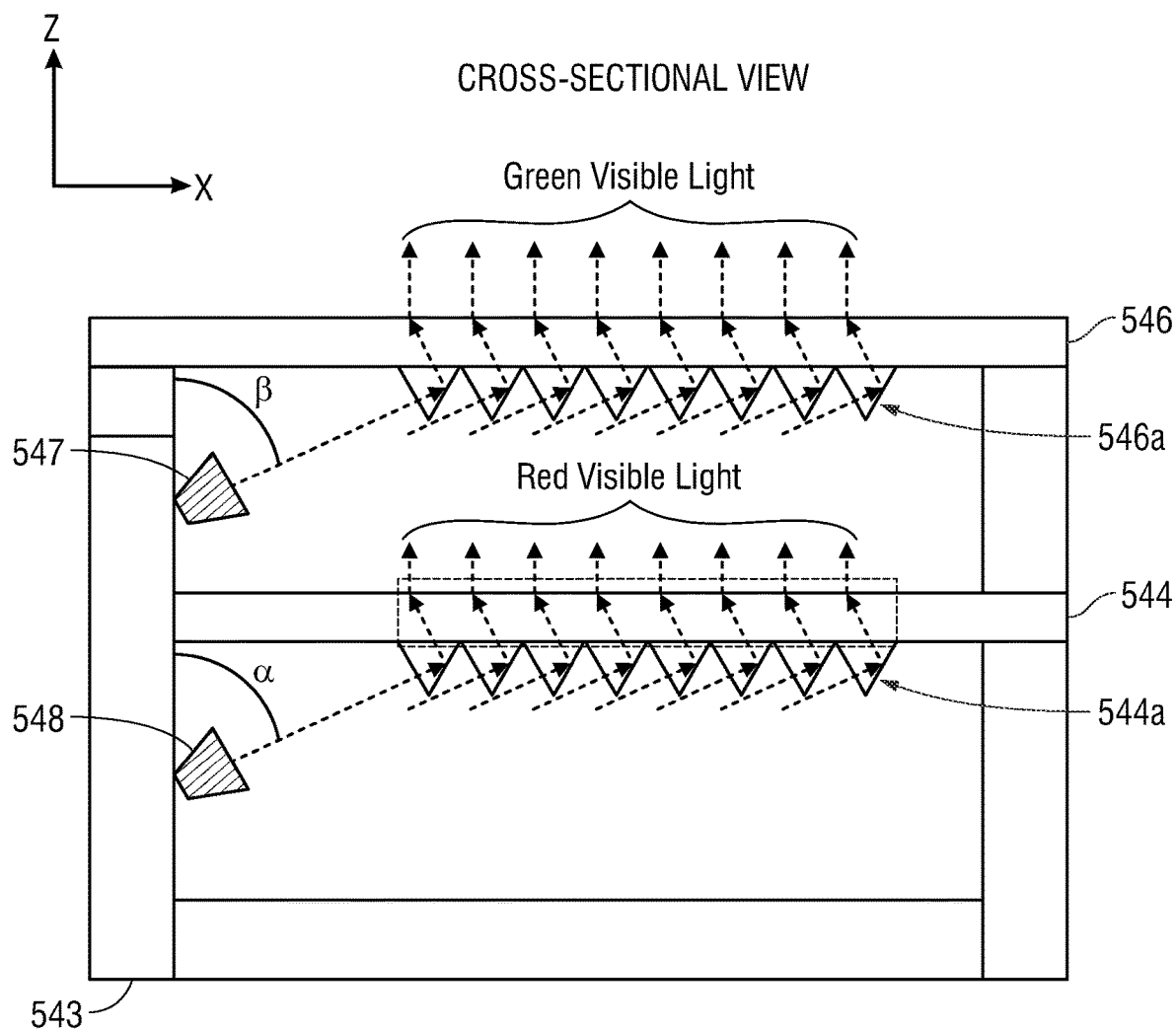
FIG. 5C is a graphical diagram illustrating a cross-sectional view of a plurality of light prism arrays for refracting light of various colors and in various icon shapes through a top and bottom acrylic panel of a replaceable icon and speaker module according to an embodiment of the present disclosure.

FIG. 5C is a graphical diagram illustrating a cross-sectional view of a plurality of light-emitting diode (LED) prism arrays in the shapes of a plurality of icons for refracting light emitted from a plurality of LED arrays situated at a determined angle from the prism arrays through a top and bottom acrylic panel according to an embodiment of the present disclosure. The light refraction is specific to the location and angle of the side-mounted LEDs relative to the etched prism and acrylic panel. As described herein, in order to display each of a plurality of icons within the same space of the icon panel in an embodiment, the replaceable icon and speaker module may include a plurality of vertically stacked acrylic panels 544 and 546, with each acrylic panel 544 and 546 capable of routing visible light of a specific color from a nearby LED (e.g., 548a and 547a, respectively) for that color of side-mounted LED at a specific angle that allows light prism arrays (e.g., 544a and 546a) having specific refractive indexes to reflect or refract the light emitted from those LEDs (e.g., 548 and 547, respectively). This light is then reflected or refracted upward and through a touch icon zone of the icon panel of the replaceable icon and speaker module.

The light prism array 544*a* may be etched into the bottom surface of the bottom acrylic panel 544 and may have a refractive index for refracting light of a first color emitted from the LED 548 angled upward and toward the bottom of the bottom acrylic panel 544. The value of the angle α at which the LED 548 may emit light of the first color to allow the light prism array 544*a* to reflect or refract that emitted light of the first color upward to a touch icon zone may be determined for the light prism array 544*a*. The LED 548 in such an embodiment may be side-mounted on the LED array circuit panel 543 with respect to underneath the bottom acrylic panel 544.

The light prism array 546*a* in an embodiment may be etched into the bottom surface of the top acrylic panel 546 and may have a refractive index for refracting light of a second color emitted from the LED 547 angled upward and toward the bottom of the top acrylic panel 544. The refractive index of the array 546*a* in an embodiment may also allow for passage of the light of the first color refracted or reflected upward by the array 544*a* in an embodiment in which the LED 548 is turned on and the LED 547 is turned off. The value of the angle β at which the LED 547 may emit light at the light prism array 546*a* that causes light prism array 546*a* to reflect or refract that emitted light of the second color upward to the touch icon zone is determined for the light prism 546*a*. The LED 547 in such an embodiment may be side-mounted on the LED circuit array panel 543 with respect to underneath the top acrylic panel 546.

Figure 6:
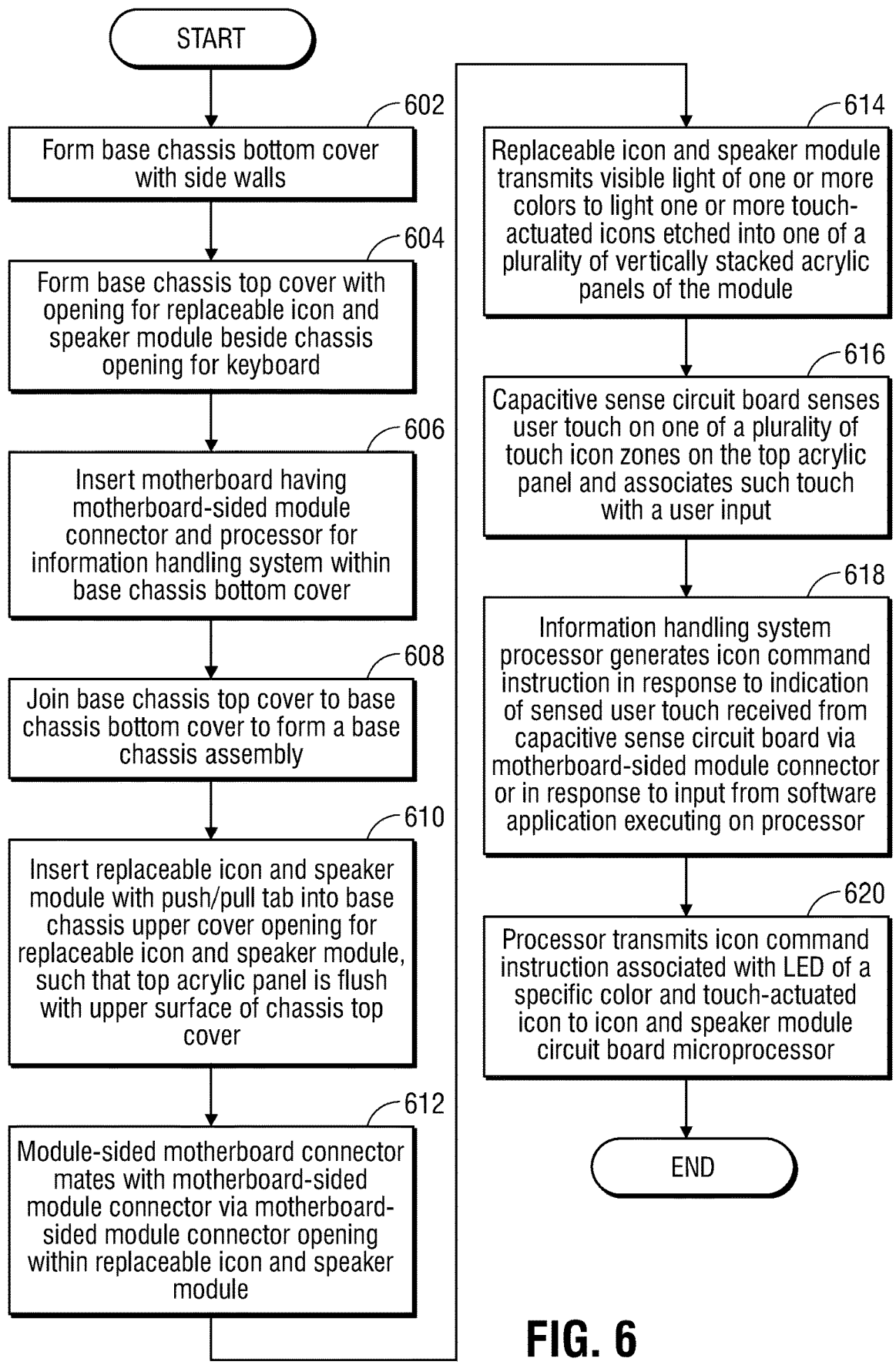
FIG. 6 is a flow diagram illustrating a method of assembling a mobile information handling system chassis incorporating a replaceable icon and speaker module according to an embodiment of the present disclosure.

FIG. 6 is a flow diagram illustrating a method of forming a mobile information handling system chassis incorporating a replaceable icon and speaker module for lighting variously-colored touch-actuated icons according to an embodiment of the present disclosure. As described herein, the replaceable icon and speaker module in an embodiment may incorporate a variety of animated icons, each capable of showing multiple statuses of a single software or hardware feature of the information handling system. Such a replaceable icon and speaker module in an embodiment may also provide a piezoelectric actuator speaker for enhancing sound output for the information handling system. The replaceable icon and speaker module in embodiments may be modular, such that the replaceable icon and speaker module can be removed, switched, or replaced by another module with other user-chosen icons, without separating the base chassis bottom cover from the base chassis top cover, which may damage the chassis and various internal components, and without having to replace the motherboard of the information handling system.

At block 602, a base chassis bottom cover with side walls may be formed in an embodiment. For example, in an embodiment described with reference to FIGS. 3A and 3C, a base chassis bottom cover 310 may be formed in an embodiment with side walls 315. A base chassis top cover may be formed in an embodiment with an opening sized to receive the replaceable icon and speaker module beside a chassis location for keyboard at block 604. For example, in an embodiment described with respect to FIG. 2, a base chassis top cover 211 may be formed with a location for a keyboard 220, and opening for a replaceable icon and speaker module 230. In another example described with reference to FIGS. 3A and 3C, the base chassis top cover 311 may be formed with a top cover chassis opening 314 for the replaceable icon and speaker module 330 beside the chassis opening for keyboard 320. The replaceable icon and speaker module 330 in such an embodiment may be removed from or inserted into the top cover chassis opening 314 for the replaceable icon and speaker module 330.

At block 606, a motherboard including a processor for the information handling system and a motherboard-sided module connector may be inserted within the base chassis bottom cover in an embodiment. For example, in an embodiment described with reference to FIG. 1, the hardware processor 101 may be affixed to or operate as a part of a motherboard along with other components of the information handling system. In other example embodiments described with respect to FIGS. 3C, and 3D, a motherboard 360 for the information handling system and a motherboard-sided module connector 361 may be inserted within the base chassis bottom cover 310 along with other information handling system components on boards.

The base chassis top cover may be joined in an embodiment to the base chassis bottom cover at block 608 to form a base chassis assembly. For example, in an embodiment described with reference to FIG. 2, the base chassis top cover 211 may be joined to a base chassis bottom cover 210, to form a mobile information handling system base chassis.

At block 610, the replaceable icon and speaker module with a push/pull tab may be inserted within the base chassis upper cover opening beside the bottom cover side wall, such that the top acrylic panel of the replaceable icon and speaker module is flush with the upper surface of the base chassis top cover. For example, in an embodiment described with reference to FIG. 2, the replaceable icon and speaker module 230 may be inserted between the keyboard 220 and a side wall of the base chassis bottom cover 210. In an embodiment, the replaceable icon and speaker module 230 may be removable and replaceable without separating the base chassis top cover 211 from the base chassis bottom cover 210 and without replacing the motherboard for the mobile information handling system. The replaceable icon and speaker module 230 top surface may be flush with the top surface of the base chassis top cover 211 in an embodiment upon insertion of the replaceable icon and speaker module 230 within the top cover chassis opening. In another example embodiment described with respect to FIGS. 3A and 3C, the connector module push/pull tab 331 located on the top surface of the replaceable icon and speaker module 330 may be pulled by a user to remove the replaceable icon and speaker module 330 from the mobile information handling system top cover chassis opening 314. The replaceable icon and speaker module 330 with a push/pull tab 331 may be inserted within the base chassis top cover opening 314 beside the bottom cover side wall 315.

The module-sided motherboard connector of the replaceable icon and speaker module in an embodiment may mate with the motherboard-sided module connector in the base chassis assembly via the motherboard-sided module connector opening within the bottom of the replaceable icon and speaker module at block 612. For example, in embodiments described with reference to FIGS. 3B, 3C, and 3D, the module-sided motherboard connector 332 may mate with a motherboard-sided module connector 361 of the mobile information handling system via a motherboard-sided module connector opening 333 within the replaceable icon and speaker module housing 340 for receiving the motherboard-sided module connector 361. Such a mating of the module-sided motherboard connector 332 with the motherboard-sided module connector 361 may operatively couple a piezoelectric actuator speaker and a capacitive sense circuit board 341 housed within the replaceable icon and speaker module housing 340 to the motherboard 360 of the mobile information handling system. The module-sided motherboard connector 332 may be partially disposed through the motherboard-sided module connector opening 333 at the bottom side of the replaceable icon and speaker module housing 340, for mating with the motherboard-sided module connector 361 disposed in the opening in the base chassis assembly that is sized to receive the replaceable icon and speaker module 330.

Figure 9:
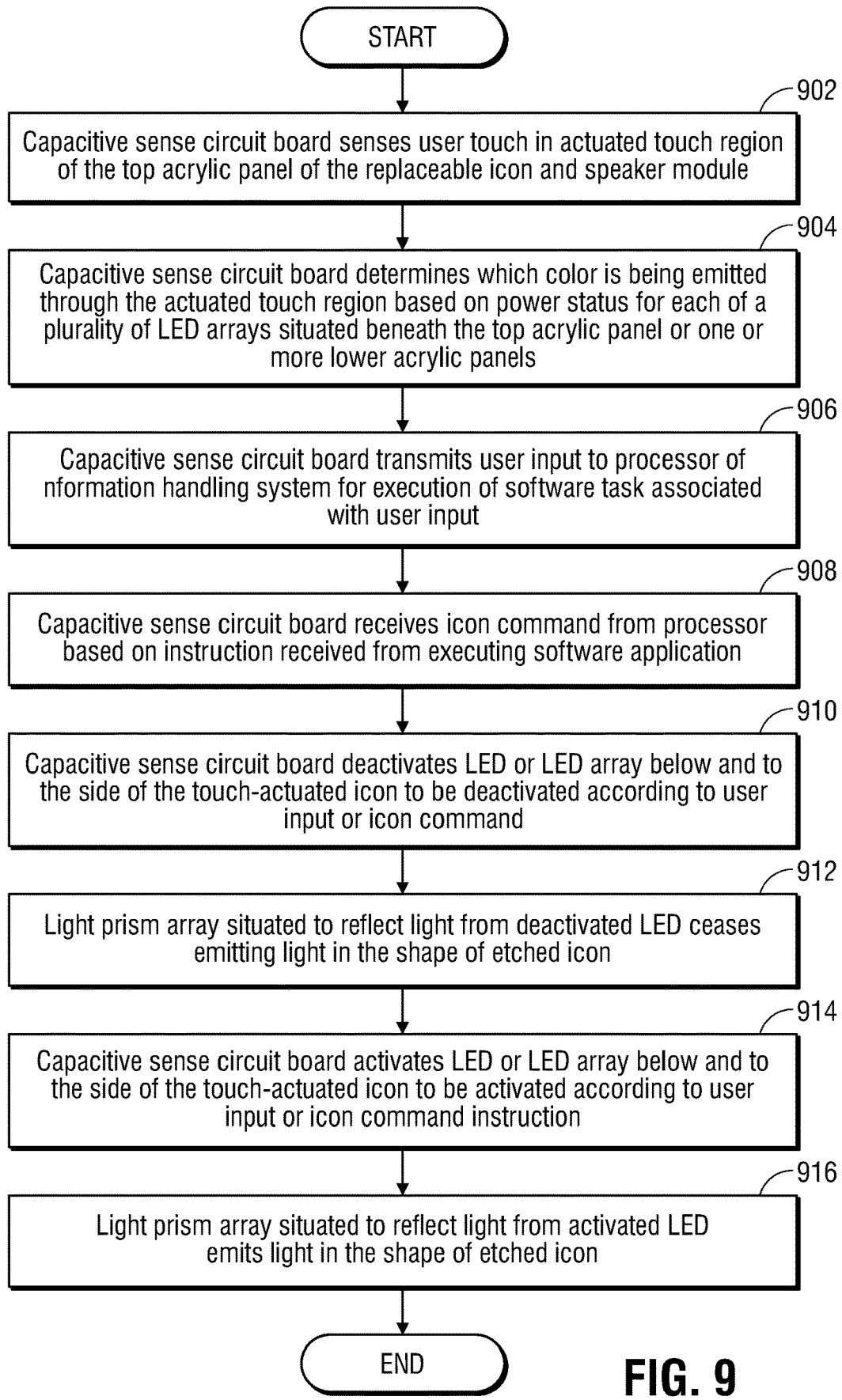
FIG. 9 is a flow diagram illustrating a method of operating a plurality of variously colored and touch-actuated icons of a replaceable icon and speaker module in an information handling system according to an embodiment of the present disclosure.

At block 614, the replaceable icon and speaker module may transmit visible light of one or more colors to light one or more touch-actuated icons etched into a plurality of vertically stacked acrylic panels of the replaceable icon and speaker module in an embodiment. FIG. 9, below, may describe in greater detail the transmission of visible light of one or more colors through etched icons of a plurality of vertically stacked acrylic panels in an embodiment. In an embodiment described with reference to FIG. 4B, the animated icon visible in any given touch icon zone of an icon panel 470 on the top surface of the replaceable icon and speaker module may change in shape or color based on user input or based on functionality of software applications executing at the information handling system due to plural icons etched in the stacked acrylic panels. For example, one touch icon zone 471 of the icon panel 470 in an embodiment may display a plurality of icons indicating a status of the microphone for the information handling system, including one icon (e.g., in white light) in the shape of a microphone indicating availability for a currently executing software application to record the user's voice, a second icon of the same shape (e.g., in green light as shown in FIG. 4B) indicating that the software application is currently recording the user's voice, and a third icon (e.g., in red light as shown in FIG. 4C) in the shape of a microphone with a line crossed through it indicating that the software application is not currently recording the user's voice. All three of these icons or other example icons in embodiments may be visible to the user within the same touch icon zone 471 of the icon panel for the replaceable icon and speaker module based on the current status of the microphone, giving a sense of animation of the icons.

A capacitive sense circuit board of the replaceable icon and speaker module in an embodiment at block 616 may sense user touch on one of a plurality of touch icon zones on the top acrylic panel and associate such touch with a user input. For example, in an embodiment described with reference to FIG. 5A, the replaceable icon and speaker module may include a capacitive sense circuit board 541 operatively coupled to one or more capacitive touch sensing layers or other touch sensors for detecting a user touch within each specific touch icon zone (e.g., 571, 572, 573, or 574) of the icon panel 570 on the top acrylic panel 546 of the replaceable icon and speaker module 530. The capacitive touch layer may be individual to each touch icon zone or across the icon panel 570 generally, with touch icon zones specified in identified areas. Upon identifying user touch in a given icon panel touch icon zone (e.g., 571), a microprocessor of the capacitive sense circuit board 541 executing code instructions of a touch-actuated icon and speaker control system may determine which of the plurality of available icons (e.g., 544a or 546a) of varying colors was visible to the user at the time of the touch in order to determine a user input indicated by such touch. For example, if a user touches icon 546a in the shape of a microphone and emitting green light with LED 547a being on (indicating that the microphone is currently active and recording), the microprocessor may associate such a user touch with a user input to deactivate the microphone. In another example, if a user touches an icon 544a in the shape of a microphone with a line through it and emitting red light with LED 548a on (indicating that the microphone is currently inactive or muted), the microprocessor may associate such a user touch with a user input to reactivate the microphone and resume recording.

The microprocessor for the capacitive sense circuit board in embodiments may transmit such determined user input to the processor for the information handling system for execution within a software application (e.g., activate microphone, deactivate microphone, reactivate microphone) via the module-sided motherboard connector 532. For example, in an embodiment described with reference to FIG. 1, the microprocessor 190 may be capable of sensing a user touch of one or more touch-actuated icons of the replaceable icon and speaker module 130, and transmitting an indication of such a sensed user touch to the hardware processor 101 via bus 108.

At block 618, the information handling system processor in an embodiment may generate an icon command in response to an indication of sensed user touch received from the capacitive sense circuit board via a motherboard-sided module connector or in response to input from a software application executing on the processor. For example, in an embodiment described with reference to FIG. 1, the hardware processor 101 may generate icon commands for the operation of the LED array 147 and particular LEDs based upon such received indications of user touch of the icons, or based on received input from a software application executing at the hardware processor 101.

In an example embodiment described with reference to FIG. 5B, the processor of the information handling system may generate an icon command for changing which icon is visible to the user. More specifically, where the user has indicated a desire to mute the microphone, either through direct interface with a software application accessing the microphone (e.g., videoconferencing application), or through touch-actuation of the icon 546a, in touch icon zone 571, the processor or the microprocessor of the capacitive sense circuit board 541 may generate an icon command to deactivate LED 547a, and activate LED 548a. As another example, where the user has indicated a desire to turn on the camera, either through direct interface with a software application accessing the camera (e.g., videoconferencing application), or through touch-actuation of the icon 544b in touch icon zone 572, the processor may generate an icon command to deactivate LED 548b, and activate LED 547b. In still another example, where a software application is not currently executing to record the user's voice or process such recordings, the processor may transmit an icon command instruction to the microprocessor of the capacitive sense circuit board 541 to make none of the icons (e.g., 546a or 544a) associated with the microphone feature visible to the user by turning of the LEDs.

The processor in an embodiment may transmit an icon command for an LED of a specific color associated with a touch-actuated icon to the icon and speaker module circuit board microprocessor at block 620. For example, in an embodiment described with reference to FIG. 1, the hardware processor 101 may transmit an icon command to a microprocessor 190 on the replaceable icon and speaker module 130 to cause one or more LEDs in one or more LED arrays (e.g., 147) of various colors to emit light, lighting one or more touch-actuated icons for the user to view in a specific color, or to cease to emit light, making those icons non-visible to the user. As another example, in an embodiment described with respect to FIG. 5B, the processor of the information handling system may also transmit icon commands to the microcontroller on the replaceable icon and speaker module 130 for changing which icon is visible to the user. More specifically, where the user has indicated a desire to mute the microphone, either through direct interface with a software application accessing the microphone (e.g., videoconferencing application), or through touch-actuation of the icon 546a, the processor or the microcontroller of the capacitive sense circuit board 541 may deactivate LED 547a, and activate LED 548a. This may make the green-lit icon 546a no longer visible to the user via icon panel 570, and may make the red-lit icon 544a visible to the user instead. As another example, where the user has indicated a desire to turn on the camera, either through direct interface with a software application accessing the camera (e.g., videoconferencing application), or through touch-actuation of the icon 544b, the processor or the microprocessor of the capacitive sense circuit board 541 may deactivate LED 548b, and activate LED 547b. This may make the red-lit icon 544b no longer visible to the user via icon panel 570, and may make the green-lit icon 546b visible to the user instead. In still another example, where a software application is not currently executing to record the user's voice or process such recordings, the processor may transmit an icon command to the microprocessor of the capacitive sense circuit board 541 to make none of the icons (e.g., 546a or 544a) associated with the microphone feature visible to the user. Upon execution of such an icon command (or determined user input) to make none of the icons (e.g., 546a or 544a) within a specific touch icon zone 571 of the icon panel 570 visible to the user, the microprocessor may deactivate all LEDs (e.g., 547a and 548a) associated with that touch icon zone 571. Thus, those icons 546a or 544a are no longer visible such that that at least a portion 571 of the icon panel 570 appears identical to the surrounding base chassis top cover, with no visible icons.

In such a way, the replaceable icon and speaker module in an embodiment may incorporate a variety of animated icons, each capable of showing multiple statuses of a single software or hardware feature of the information handling system, and may provide a piezoelectric actuator speaker for enhancing sound output for the information handling system. The replaceable icon and speaker module in embodiments may be modular, such that the replaceable icon and speaker module can be removed, switched, or replaced by another module with other user-chosen icons, without separating the base chassis bottom cover from the base chassis top cover, which may damage the chassis and various internal components, and without having to replace the motherboard of the information handling system. The method for forming a mobile information handling system chassis incorporating a replaceable icon and speaker module for lighting variously-colored touch-actuated icons may then end.

Figure 7:
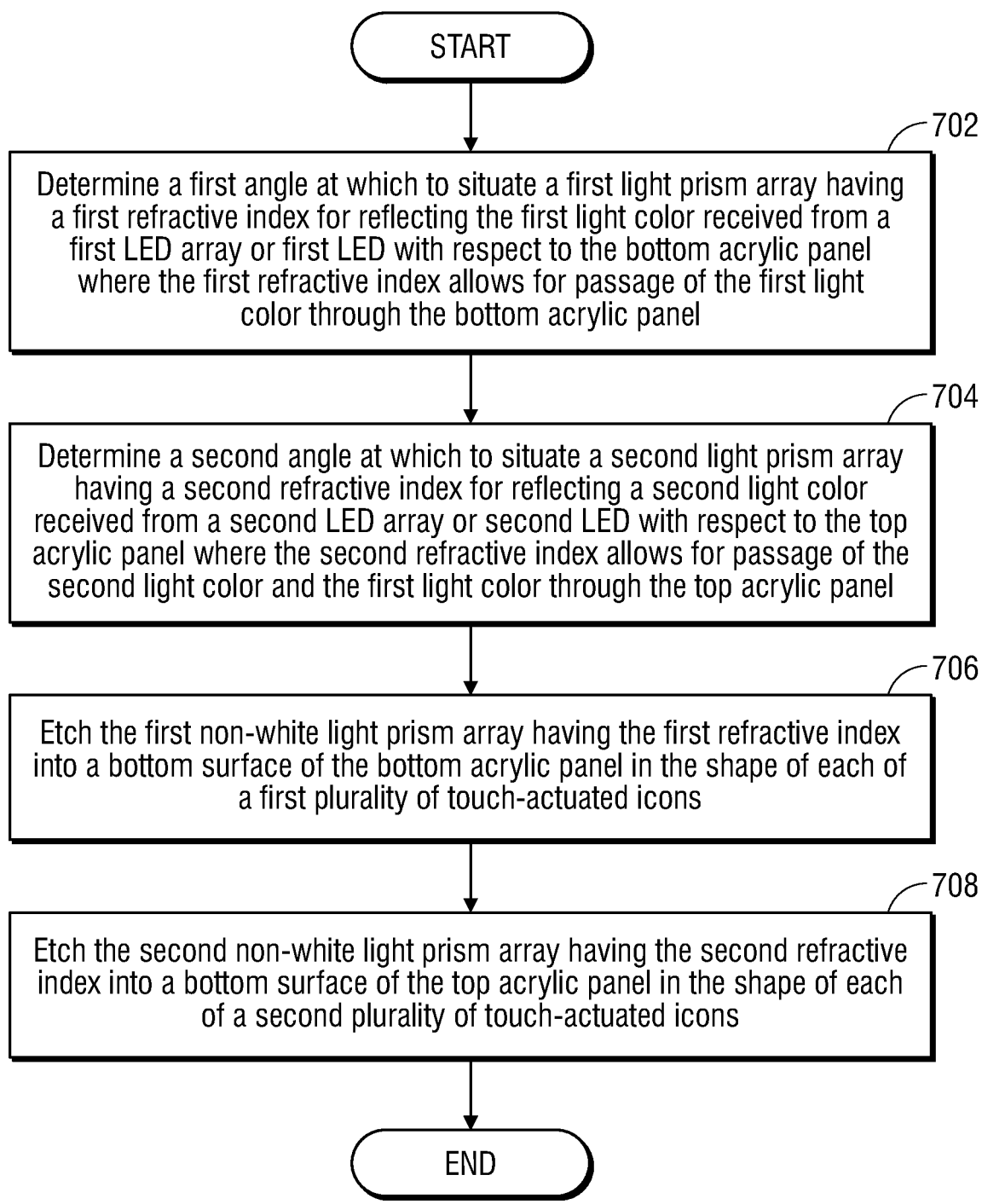
FIG. 7 is a flow diagram illustrating a method of forming a top and bottom acrylic panel, each having a plurality of light prism arrays in the shapes of a plurality of lit icons to be visible to a user for use in a replaceable icon and speaker module according to an embodiment of the present disclosure.

FIG. 7 is a flow diagram illustrating a method of forming a top and bottom acrylic panel, each having a plurality of light prism arrays in the shapes of a plurality of icons for refracting light from side-mounted light-emitting diodes (LEDs) situated at an angle determined to reflect or refract light of a specific color upward through each light prism array to be visible to a user according to an embodiment of the present disclosure. As described herein, in order to display each of a plurality of icons within the same touch icon zone of the icon panel in an embodiment, the replaceable icon and speaker module may include a plurality of vertically stacked acrylic panels, with each acrylic panel capable of routing visible light of a specific color from a nearby side-mounted LED of that color side-mounted at a specific angle underneath the acrylic panel that allows the corresponding light prism array having specific refractive indexes to reflect or refract the light emitted from those LEDs upward and through the icon panel of the replaceable icon and speaker module at specific touch icon zones.

At block 702, a first angle at which to situate a refractive angle of a first light prism array having a first refractive index for refracting the first light color received from a first LED angled with respect to underneath the bottom acrylic panel may be determined. The first refractive index allows for passage of the first light color through the bottom acrylic panel, based on an angle of the LED light and the etched prism geometry for an icon of a touch icon zone. For example, in an embodiment described with respect to FIG. 5C, the light prism array 544a may be etched into the bottom surface of the bottom acrylic panel 544 with such a geometry to have a refractive index for refracting red light emitted from the LED 548 that is upward and through the bottom acrylic panel 544. At block 702, the value of the angle α at which the LED 548 may emit red light toward the light prism array 544a to refract the emitted red light upward to touch icon zone 571 may be determined. The LED 548 in such an embodiment may be side-mounted to the LED circuit panel 543 and angled underneath the bottom acrylic panel 544.

A second angle may be determined at block 704 at which to situate a refractive angle of a second light prism array having a second refractive index for refracting a second light color received from a second LED angled with respect to underneath the top acrylic panel, where the second refractive index allows for passage of the second light color based on an angle of the LED and the etched prism geometry of the second light prism array, as well as passage of the first light color through the top acrylic panel. For example, with respect to FIG. 5C, the light prism array 546a in an embodiment may be etched into the bottom surface of the top acrylic panel 546 with such a geometry to have a refractive index for refracting red light emitted from the LED 547 angled upward and through the top acrylic panel 544. The refractive index of the array 546a in an embodiment may also allow for passage of the green light refracted upward by the array 544a in an embodiment in which the LED 548 is turned on and the LED 547 is turned off. At block 704, the value of the angle β at which the LED 547 may emit light to allow the light prism array 546a to refract the emitted green light upward to an icon touch zone may be determined. The LED 547 in such an embodiment may be side-mounted to the LED circuit panel 543 and underneath the top acrylic panel 546 but above bottom acrylic panel 544.

At block 706, the first light prism array having the first refractive index in an embodiment may be etched into the bottom surface of the bottom acrylic panel in the shape of each of a plurality of icons. For example, in an embodiment described with reference to FIG. 5A, the bottom acrylic panel 544 in an embodiment may include a first array of light prisms 544a etched into the icon shape of a microphone with a line through it, a second array of light prisms 544b etched into the icon shape of a camera with a line through it, a third array of light prisms 544c etched into the icon shape of a box with an arrow pointing to it and a line through both the box and the arrow, and a fourth array of light prisms 544d etched into the icon shape of a chat box with a line through it. Each of the arrays of light prisms 544a, 544b, 544c, and 544d etched into the bottom acrylic panel 544 in an embodiment may have refractive indexes and etched geometry specific for refracting red light provided at particular angles from corresponding nearby side-mounted red LEDs.

The second light prism array having the second refractive index in an embodiment may be etched into to the bottom surface of the top acrylic panel in the shape of each of a plurality of icons in an embodiment at block 708. For example, top acrylic panel 546 in an embodiment may include a first array of light prisms 546*a* etched into the icon shape of a microphone, a second array of light prisms 546*b* etched into the icon shape of a camera, a third array of light prisms 546*c* etched into the icon shape of a box with an arrow pointing to it, and a fourth array of light prisms 546*d* etched into the icon shape of a chat box. Each of the arrays of light prisms 546*a*, 546*b*, 546*c*, and 546*d* etched into the top acrylic panel 546 in an embodiment may have refractive indexes and etched geometry specific for refracting green light provided at particular angles from corresponding nearby side-mounted green LEDs.

In such a way, the replaceable icon and speaker module and its plurality of vertically stacked acrylic panels capable of routing visible light of a specific color from a nearby LED may display each of a plurality of icons within the same touch icon zone of the icon panel. The method for forming a top and bottom acrylic panel, each having a plurality of light prism arrays in the shapes of a plurality of icons for refracting light from particular LEDs situated at an angle determined to reflect or refract light of a specific color upward through designated touch icon zones to be visible to a user may then end.

Figure 8:
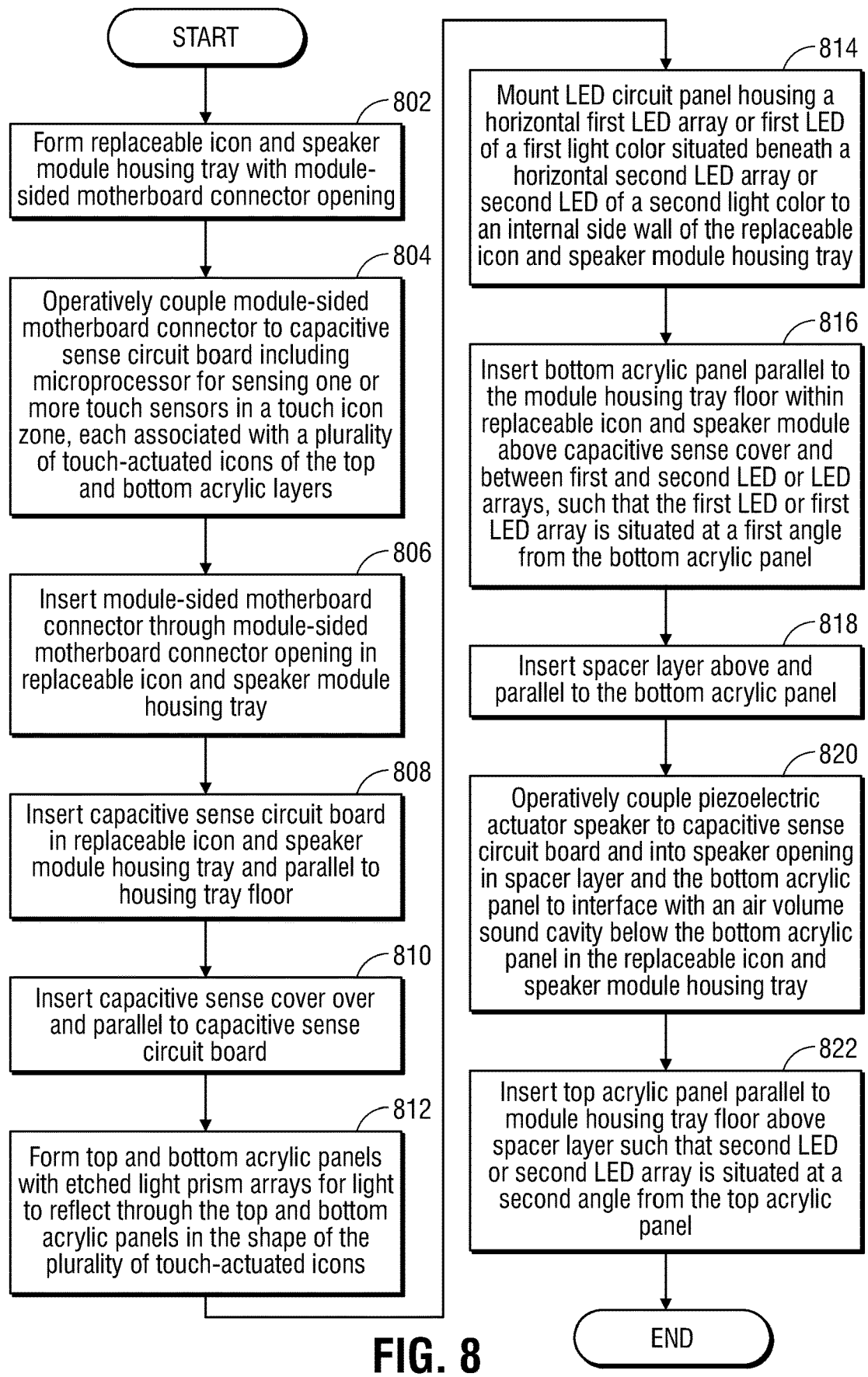
FIG. 8 is a flow diagram illustrating a method of assembling a replaceable icon and speaker module according to an embodiment of the present disclosure.

FIG. 8 is a flow diagram illustrating a method of forming a replaceable icon and speaker module for generating sound and operating a plurality of variously-colored touch-actuated icons according to an embodiment of the present disclosure. As described herein, the icons of the replaceable icon and speaker module in embodiments may be animated in that the icon visible in any given touch icon zone of an icon panel on the top surface of the replaceable icon and speaker module may change in shape or color based on user input or based on functionality of software applications executing at the information handling system. For example, one touch icon zone of the icon panel in embodiments may display a plurality of icons indicating a status of the microphone for the information handling system, including one icon (e.g., in white light) in the shape of a microphone indicating ability of a currently executing software application to record the user's voice, a second icon of the same shape (e.g., in green light) indicating that the software application is currently recording the user's voice, and a third icon (e.g., in red light) in the shape of a microphone with a line crossed through it indicating that the software application is not currently recording the user's voice. All three of these icons or other example icons in embodiments may be visible to the user within the same touch icon zone of the icon panel for the replaceable icon and speaker module based on the current status of the microphone, giving a sense of animation of the icons.

In order to display each of a plurality of icons within the same touch icon zone of the icon panel in such a way, the replaceable icon and speaker module in an embodiment may include a plurality of vertically stacked acrylic panels, with each acrylic panel capable of routing visible light of a specific color from a nearby side-mounted LED of that color. Each of these vertically stacked acrylic panels in embodiments may include arrays of light prisms etched into their bottom surfaces with a geometry having refractive indexes for refracting light of a specific color (e.g., white, green, or red) from the nearby side-mounted LEDs. Such arrays of light prisms may be etched across the underside surface of the acrylic panel to have the shape of a different icon.

At block 802, a replaceable icon and speaker module housing tray with a module-sided motherboard connector opening may be formed in an embodiment. For example, in an embodiment described with reference to FIG. 3B, a replaceable icon and speaker module housing tray 340 may be formed to include an opening 333 in the bottom for a module-sided motherboard connector 332 to receive insertion of a motherboard-sided module connector for mating with the module-sided motherboard connector 332.

The capacitive sense circuit board may be operatively connected to a module-sided motherboard connector in an embodiment at block 804. For example, in an embodiment described with reference to FIG. 3D, a module-sided motherboard connector 332 may be housed within the replaceable icon and speaker module housing 340 and may mate with a motherboard-sided module connector 361 via motherboard-sided module connector opening 333. Such a mating of the module-sided motherboard connector 332 with the motherboard-sided module connector 361 may operatively connect the capacitive sense circuit board 341 housed within the replaceable icon and speaker module housing 340 to the motherboard 360 of the mobile information handling system.

The capacitive sense circuit board in an embodiment may also include a microprocessor for sensing one or more touch sensors at touch icon zones, each associated with a touch icon zones for plurality of touch-actuated icons of the top and bottom acrylic layers. For example, in an embodiment described with reference to FIG. 1, the replaceable icon and speaker module 130 may include a capacitive sense circuit board housing a microprocessor 190 capable of detecting a user touch through a capacitive sensor 141*a* within a specific touch icon zone of the icon panel (e.g., associated with a known feature such as a microphone) on the top surface of the replaceable icon and speaker module 130. Such a capacitive sensor 141*a* in an embodiment may include, for example, one or more capacitive touch sensors, each for sensing a user touch within a specific touch icon zone of the icon panel for the replaceable icon and speaker module 130. In another example embodiment described with reference to FIG. 5A, the replaceable icon and speaker module may include a capacitive sense circuit board 541 capable of detecting a user touch within a specific touch icon zone (e.g., 571, 572, 573, or 574) of the icon panel 570 on the top acrylic panel 546 of the replaceable icon and speaker module 530.

At block 806, a module-sided motherboard connector may be inserted through the module-sided motherboard connector opening in a side, such as the bottom side of the replaceable icon and speaker module housing tray in an embodiment. For example, in an embodiment described with reference to FIG. 3B, an icon and speaker module circuit board may be fixed within the replaceable icon and speaker module housing tray 340 such that the module-sided motherboard connector 332 is partially disposed through the motherboard-sided module connector opening 333. The module-sided motherboard connector 332 may mate with a motherboard-sided module connector of the mobile information handling system via being received in the motherboard-sided module connector opening 333 within the replaceable icon and speaker module housing 340 in an embodiment. In another example embodiment described with reference to FIG. 5A, the module-sided motherboard connector 532 may be inserted through the module-sided motherboard connector opening in the replaceable icon and speaker module housing tray 540.

The capacitive sense circuit board in an embodiment may be inserted within the replaceable icon and speaker module housing tray parallel to the housing tray floor at block 808. For example, in an embodiment described with reference to FIG. 5A, the capacitive sense circuit board 541 may be installed within the replaceable icon and speaker module housing tray 540 and parallel to the housing tray floor. At block 810, a capacitive sense circuit cover may be inserted over and parallel to the capacitive sense circuit board in an embodiment. For example, in an embodiment described with reference to FIG. 5A, a capacitive sense circuit cover 542 may be inserted over and parallel to the capacitive sense circuit board 541.

At block 812, top and bottom acrylic panels may be formed with light prisms etched into their bottom surfaces for light to pass through the top and bottom acrylic panels in the shape of one or more touch actuated icons when illuminated by particular side-mounted LEDs in an embodiment. For example, the method described in an embodiment with reference to FIG. 7 may be used to form such top and bottom acrylic panels. In other example embodiments described with reference to FIGS. 4B and 4C, the icons of the replaceable icon and speaker module may be animated in that the icon visible in any given touch icon zone of an icon panel 470 on the top surface of the replaceable icon and speaker module may change in shape or color based on user input or based on functionality of software applications executing at the information handling system. More specifically, one touch icon zone 471 of the icon panel 470 in an embodiment may display a plurality of icons indicating a status of the microphone for the information handling system, including one icon (e.g., in white light) in the shape of a microphone indicating ability of a currently executing software application to record the user's voice, a second icon of the same shape (e.g., in green light as shown in FIG. 4B) indicating that the software application is currently recording the user's voice, and a third icon (e.g., in red light as shown in FIG. 4C) in the shape of a microphone with a line crossed through it indicating that the software application is not currently recording the user's voice. All three of these icons or other example icons in embodiments may be visible to the user within the same touch icon zone 471 of the icon panel for the replaceable icon and speaker module based on the current status of the microphone, giving a sense of animation of the icons.

An LED array circuit panel housing a first horizontal array of a first light color situated beneath a second horizontal array of a second light color may be mounted to an internal side wall of the replaceable icon and speaker module housing tray in an embodiment at block 814. Each LED may be assigned to a particular icon under each touch icon zone in example embodiments. For example, in an embodiment described with reference to FIG. 5A, an LED array circuit panel 543 housing a first horizontal array (e.g., including 548a and 548b) of a first light color (e.g., red) situated beneath a second horizontal array (e.g., including 547a and 547b) of a second light color (e.g., green) may be mounted to an internal side wall of the replaceable icon and speaker module housing tray 540.

At block 816, a bottom acrylic panel may be inserted parallel to the replaceable icon and speaker module housing tray floor within the replaceable icon and speaker module above the capacitive sense circuit cover such that LEDs of the first LED array is situated at angles from the bottom acrylic panel to correspond for icons etched into the bottom acrylic panel for each of the plurality of touch icon zones. For example, in an embodiment described with reference to FIG. 5A, a bottom acrylic panel 544 may be inserted parallel to the replaceable icon and speaker module housing tray 540 floor within the replaceable icon and speaker module 530 above the capacitive sense circuit cover 542. In another example embodiment described with reference to FIG. 5B, the bottom acrylic panel 544 may be situated between LEDs 548a and 548b of the first LED array and LED 547a and 547b of the second LED array. In still other example embodiments described with reference to FIGS. 5C, the bottom acrylic panel 544 may be situated at a first angle α from the LED 548 and the top acrylic panel 546 may be situated at a first angle β from the LED 547.

A spacer layer may be inserted above and parallel to the bottom acrylic panel in an embodiment at block 818. For example, in an embodiment described with reference to FIG. 5A, a spacer layer 545 of an opaque material may be inserted above and parallel to the bottom acrylic panel 544, to seal in air and for prevention of bleeding through of light emitted from LEDs mounted to the LED circuit board 543 outside of the touch-actuated icons (e.g., 471, 472, and 473) and defining the icon panel 570.

At block 820, a piezoelectric actuator speaker in an embodiment may be operatively connected to the capacitive sense circuit board and inserted into the speaker opening in the spacer layer and bottom acrylic panel. For example, in an embodiment described with reference to FIG. 5A, a piezoelectric actuator speaker 580 may be operatively connected to the capacitive sense circuit board 541, via the electrical connector 581. The replaceable icon and speaker module 530 is inserted into the icon and speaker opening 570 in the spacer layer 545 and the speaker opening 582 in the bottom acrylic panel 544 to access an air volume sound cavity in the replaceable icon and speaker housing tray 540. The electrical connector 581 in an embodiment may be wrapped around a notch 583 of the capacitive sense circuit cover 542 to operatively couple the piezoelectric actuator speaker 580, which may be disposed above the capacitive sense circuit cover 542 to the capacitive sense circuit board 541, which may be disposed below the capacitive sense circuit cover 542. The top acrylic panel 546 may be vibrated by piezoelectric actuator speaker 580 to generate sound and haptics.

The top acrylic panel may be inserted parallel to bottom acrylic panel above the spacer layer such that LEDs in the second LED array are situated at second angles from the top acrylic panel for each touch icon zone in an embodiment at block 822. For example, in an embodiment described with reference to FIG. 5A, a top acrylic panel 546 may be inserted parallel to bottom acrylic panel 544, above the spacer layer 545. This top acrylic panel 546 may be bonded or adhered to the icon and speaker module housing tray 540 to form the top surface of the icon and speaker module 530. In another example embodiment described with reference to FIG. 5B, the top acrylic panel 546 may be situated above LEDs 547a and 548a of the second LED array. In still other example embodiments described with reference to FIGS. 5C, the top acrylic panel 546 may be situated at a second angle β from the LED 547.

In such a way, the replaceable icon and speaker module may include a plurality of vertically stacked acrylic panels, with each acrylic panel capable of routing visible light of a specific color from a nearby side-mounted LED of that color through an etched shape of a different icon. The method for forming a replaceable icon and speaker module for generating sound and operating a plurality of variously-colored touch-actuated icons may then end.

FIG. 9 is a flow diagram illustrating a method of operating a plurality of variously-colored and touch-actuated icons of a replaceable icon and speaker module, each associated with a specific software application feature according to an embodiment of the present disclosure. As described herein, the variously-colored icons of the replaceable icon and speaker module may be touch-actuated to allow the user to change the status of the icon-representing feature through touch of the animated icon. Upon identifying user touch in a given icon panel touch icon zone, a microprocessor of the capacitive sense circuit board executing code instructions of a touch-actuated icon and speaker control system may determine which of the plurality of available icons of varying colors was visible to the user at the time of the touch of a corresponding touch icon zone in order to determine a user input indicated by such touch. The microprocessor for the capacitive sense circuit board in embodiments may transmit such determined user input to the processor for the information handling system for execution within a software application (e.g., activate microphone, deactivate microphone, reactivate microphone).

At block 902, the capacitive sense circuit board may sense user touch via a touch sensor in an actuated touch icon zone of the top acrylic panel of the replaceable icon and speaker module. For example, in an embodiment described with reference to FIG. 5A, one touch icon zone (e.g., 571) of the icon panel 570 in an embodiment may be capable of displaying a plurality of icons (e.g., 546a or 544a) indicating a status of the microphone for the information handling system. In an example embodiment, such a single touch icon zone 571 of the icon panel 570 may include one icon 546a in the shape of a microphone indicating ability of a currently executing software application to record the user's voice, or a second icon 544a in the shape of a microphone with a line crossed through it indicating that the software application is not currently recording the user's voice. Each of these icons 546a or 544a or other example icons (e.g., 544b, 544c, 544d, 546b, 546c, or 546d) in an embodiment may be visible to the user within the same touch icon zone of the icon panel (e.g., 571, 572, 573, or 574, respectively) for the replaceable icon and speaker module 530 based on the current status of the microphone, giving a sense of animation of the icons. In an embodiment, the replaceable icon and speaker module may include a capacitive sense circuit board 541 capable of detecting a user touch within a specific touch icon zone (e.g., 571, 572, 573, or 574) of the icon panel 570 on the top acrylic panel 546 of the replaceable icon and speaker module 530 via one or more capacitive touch sensors at those touch icon zones.

The capacitive sense circuit board in an embodiment at block 904 may determine which color is being emitted through the actuated touch icon zone based on a power status for each LED of the plurality of LED arrays situated beneath the top acrylic panel or one or more lower acrylic panels. For example, upon identifying user touch in a given icon panel touch icon zone (e.g., 571), a microprocessor of the capacitive sense circuit board 541 executing code instructions of a touch-actuated icon and speaker control system may determine which of the plurality of available icons (e.g., 544a or 546a) of varying colors was visible to the user at the time of the touch in order to determine a user input indicated by such touch. More specifically, if a user touch of icon 546a emitting green light in the shape of a microphone (indicating that the microphone is currently active and recording) is sensed, the microprocessor may associate such a user touch with a user input to deactivate the microphone. In another example, if a user touch of icon 544a emitting red light in the shape of a microphone with a line through it (indicating that the microphone is currently inactive or muted) is sensed, the microprocessor may associate such a user touch with a user input to reactivate the microphone and resume recording.

At block 906, the capacitive sense circuit board in an embodiment may transmit user input to the processor the information handling system for execution of a software task associated with the identified user input. For example, the microprocessor for the capacitive sense circuit board in embodiments may transmit such determined user input to the processor for the information handling system for execution within a software application (e.g., activate microphone, deactivate microphone, reactivate microphone) via the module-sided motherboard connector 532. For example, in an embodiment described with respect to FIG. 1, upon identifying user touch in a given icon panel touch icon zone, a microprocessor 190 of the capacitive sense circuit board executing code instructions 187 of a touch-actuated icon and speaker control system 191 may determine which of the plurality of available icons of varying colors was visible to the user at the time of the touch in order to determine a user input indicated by such touch. The microprocessor 190 for the capacitive sense circuit board in embodiments may transmit such determined user input to the hardware processor 101 for the information handling system 100 for execution within a software application 193 (e.g., activate microphone, deactivate microphone, reactivate microphone).

The capacitive sense circuit board in an embodiment at block 908 may receive an icon command from the processor of the information handling system, which may be based on an instruction received at the processor from a software application executing at the processor. For example, the hardware processor 101 of the information handling system 100 may transmit an icon command for making a different icon visible to the user. For example, upon startup of a software application 193 with the ability to record sound or images of the user, such as a videoconferencing application, the hardware processor 101 may transmit an icon command to the microprocessor 190 to make a white icon in the shape of the microphone visible to the user at a touch icon zone in order to indicate ability to record the user's voice within a current videoconferencing session of software application 193. As another example, where a software application 193 is not currently executing to record the user's voice or process such recordings, the hardware processor 101 may transmit an icon command to the microprocessor 190 to make none of the icons associated with the microphone feature visible to the user at a touch icon zone.

In another example embodiment described with respect to FIG. 5B, where the user has indicated a desire to mute the microphone, either through direct interface with a software application accessing the microphone (e.g., videoconferencing application), or through touch-actuation of the icon 546a, the processor may transmit an icon command to make the icon 544a visible instead of the icon 546a via commands to turn LED 547a on an LED 548a off. As another example, where the user has indicated a desire to turn on the camera, either through direct interface with a software application accessing the camera (e.g., videoconferencing application), or through touch-actuation of the icon 544b, the processor may transmit an icon command to make the icon 546b visible via LED 547b instead of the icon 544b by turning off LED 548b. In still another example, where a software application is not currently executing to record the user's voice or process such recordings, the processor may transmit an icon command to the microprocessor of the capacitive sense circuit board 541 to make none of the icons (e.g., 546a or 544a) at a touch icon zone associated with the microphone feature are visible to the user.

At block 910, the capacitive sense circuit board in an embodiment may deactivate an LED in LED array below and to the side of the touch-actuated icon to deactivate the icon according to user input or icon command instruction. For example, in an embodiment in which the processor has issued an icon command or the microprocessor of the capacitive sense circuit board 541 has sensed appropriate user input to make the icon 544a visible instead of the icon 546a, the microprocessor may deactivate LED 547a (and activate LED 548a). As another example, in which the processor has issued an icon command or the microprocessor of the capacitive sense circuit board 541 has sensed appropriate user input to make the icon 546a visible instead of the icon 544a, the microprocessor may deactivate LED 548a (and activate LED 547a).

In an embodiment at block 912, the light prism array situated to reflect or refract light from deactivated LED ceases to emit light in the shape of an etched icon according to the icon command or received user input. For example, in an embodiment in which the microprocessor deactivates LED 547b, this may make the green-lit icon 546a no longer visible to the user via icon panel 570. As another example, in which the microprocessor has deactivated LED 548a, this may make the red-lit icon 544b no longer visible to the user via icon panel 570. In still another example, microprocessor of the capacitive sense circuit board 541 may make none of the icons (e.g., 546a or 544a) associated with the microphone feature visible to the user by turning of both LED 547a and 548a.

At block 914, the capacitive sense circuit board in an embodiment may activate an LED in the LED array below and to the side of the touch-actuated icon to be activated according to user input or icon command. For example, in an embodiment in which the processor has issued an icon command or the microprocessor of the capacitive sense circuit board 541 has sensed appropriate user input to make the icon 544a visible instead of the icon 546a, the microprocessor may activate LED 548a. As another example, in an embodiment in which the processor has issued an icon command or the microprocessor of the capacitive sense circuit board 541 has sensed appropriate user input to make the icon 546a visible instead of the icon 544a, the microprocessor may activate LED 547a.

The light prism array situated to reflect or refract light from an activated LED in an embodiment at block 916 may emit light in the shape of an etched icon according to the icon command or received user input. For example, in an embodiment in which the microprocessor activates LED 547a, this may make the green-lit icon 546a visible to the user via icon panel 570. As another example, in which the microprocessor has activated LED 548a, this may make the red-lit icon 544a visible to the user via icon panel 570. In such a way, the variously-colored icons of the replaceable icon and speaker module may be touch-actuated to allow the user to change the status of the icon-representing feature through touch of the animated icon in a touch icon zone 571. The method for operating a plurality of variously-colored and touch-actuated icons of a replaceable icon and speaker module, each associated with a specific software application feature may then end.

The blocks of the flow diagram of FIGS. 6, 7, 8, and 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A base chassis assembly for an information handling system allowing user replacement of touch-actuated icons and speaker comprising:
a base chassis top cover joined to a base chassis bottom cover to form the base chassis assembly housing a motherboard with a hardware processor, a memory, and a power source, where the base chassis assembly has an opening sized to receive a replaceable icon and speaker module to be operatively coupled to the motherboard via a motherboard-sided module connector disposed in the opening;
the replaceable icon and speaker module having a top acrylic layer forming an icon panel including a plurality of touch icon zones, each of the plurality of touch icon zones including a first icon of a first plurality of icons for a first touch icon zone, the first icon formed from etching a first array of light prisms in the top acrylic layer bottom surface for refracting visible light of a first color emitted from a first side-mounted light-emitting diode (LED) to the top acrylic layer bottom surface;
the first array of light prisms having a refractive index for refracting visible light of the first color emitted from a first side-mounted LED at a first determined angle from the top acrylic layer bottom surface to illuminate the first icon in the top acrylic layer; and
a capacitive sense circuit board for sensing a first user touch at a touch sensor for the first touch icon zone to actuate one of the plurality of touch icon zones, and identifying a user input associated with the first user touch based upon identification of the icon illuminated in the first touch icon zone.

2. The base chassis assembly of claim 1 further comprising:
a second lower acrylic layer in the replaceable icon and speaker module having a second icon of the first plurality of icons for the first touch icon zone, the second icon formed from etching a second array of light prisms in a second acrylic layer bottom surface; and
the second array of light prisms having a second refractive index for refracting visible light of a second color emitted from a second side-mounted LED at a second determined angle from the second acrylic layer bottom surface to illuminate the second icon.

3. The base chassis assembly of claim 1 further comprising:
the replaceable icon and speaker module housing a piezoelectric actuator speaker operatively coupled to the motherboard via the motherboard-sided module connector.

4. The base chassis assembly of claim 1 further comprising:
the capacitive sense circuit board operatively coupled to the motherboard via the motherboard-sided module connector mating with a module-sided motherboard connector in the replaceable icon and speaker module housing, the capacitive sense circuit board to communicate the user input to the hardware processor for execution of a task for a software application executing at the hardware processor and associated with the user input.

5. The base chassis assembly of claim 1, wherein the icon panel of the replaceable icon and speaker module lies flush with the base chassis top cover when installed in the base chassis opening.

6. The base chassis assembly of claim 1 further comprising:
the replaceable icon and speaker module housing one or more lower acrylic layers situated beneath the top acrylic layer, each including a plurality of sub-surface icons formed from etching a lower acrylic layer light prism array to a lower acrylic layer bottom surface for refracting visible light of a color other than the first color, emitted from a second side-mounted LED to the top acrylic layer.

7. The base chassis assembly of claim 1 further comprising:
a second lower acrylic layer in the replaceable icon and speaker module having a second icon of the first plurality of icons for the first touch icon zone, the second icon formed from etching a second array of light prisms in a second acrylic layer bottom surface and the second icon situated within the first touch icon zone at the top acrylic layer when illuminated;
the capacitive sense circuit board for determining the user input at the first touch icon zone based on a power status of the first side-mounted LED and a second side-mounted LED for illuminating the second acrylic layer bottom surface.

8. The base chassis assembly of claim 1 further comprising:
the first icon and the second being non-visible to the user when the first side-mounted LED and the second side-mounted LED are powered down.

9. The base chassis assembly of claim 1 further comprising:
the replaceable icon and speaker module including a piezoelectric actuator speaker operatively coupled to the capacitive sense circuit board and the top acrylic layer to generate haptic and audio signals.

10. The base chassis assembly of claim 1, wherein the opening in the base chassis assembly is situated between a keyboard chassis opening in the base chassis top cover and a side wall of the base chassis bottom cover.

11. The base chassis assembly of claim 1, wherein the first color is associated with a first user input indicating activation of a task executable by the hardware processor of the information handling system.

12. The base chassis assembly of claim 1, wherein the first color is associated with a first user input indicating deactivation of a task executable by the hardware processor of the information handling system.

13. A method of manufacturing a base chassis assembly for an information handling system allowing user replacement of touch-actuated icons and speaker comprising:
forming a base chassis top cover joined to a base chassis bottom cover to form the base chassis assembly housing a motherboard with a hardware processor, a memory, and a power source, where the base chassis assembly has an opening sized to receive a replaceable icon and speaker module to be operatively coupled to the motherboard via a motherboard-sided module connector;
forming a top acrylic layer and a bottom acrylic layer of the replaceable icon and speaker module with a touch sensor at the top acrylic layer to sense user touch;
forming a first icon of the top acrylic layer by etching a first light prism array for refracting a first light color emitted from a first light emitting diode (LED) to a top acrylic layer bottom surface within a first touch icon zone;
forming a second icon of the bottom acrylic layer by etching a second light prism array for refracting a second light color emitted from a second LED to a bottom acrylic layer bottom surface within the first touch icon zone;
side-mounting the first LED at a first determined angle with respect to the first light prism array having a first refractive index for refracting a first light emitted from the first LED to illuminate the first icon in the first touch icon zone;
side-mounting the second LED at a second determined angle with respect to the second light prism array having a second refractive index for refracting a second light emitted from the second LED to illuminate the second icon in the first touch icon zone; and
operatively coupling a capacitive sense circuit board in the replaceable icon and speaker module to the touch sensor for receiving a user touch input to determine user functional input for the first icon or second icon based upon identification of which of the first icon or the second icon is illuminated in the first touch icon zone at the time of the user touch input.

14. The method of claim 13 further comprising:
operatively coupling the capacitive sense circuit board to the motherboard via a motherboard-sided module connector disposed in the opening sized to receive the replaceable icon and speaker module mating with a module-sided motherboard connector on the replaceable icon and speaker module to communicate the user functional input to the hardware processor for execution of a task for a software application executing at the hardware processor and associated with the first icon or the second icon illuminated in the first touch icon zone at the time of the user touch input.

15. The method of claim 13 further comprising:
operatively coupling the capacitive sense circuit board to the motherboard via a connector on the replaceable icon and speaker module to communicate an icon command instruction to the capacitive sense circuit board from the motherboard based on an instruction received from a software application executing at the hardware processor.

16. The method of claim 13 further comprising:
operatively coupling the capacitive sense circuit board to the first LED to activate the first LED to illuminate the first icon in accordance with an icon command instruction received at the capacitive sense circuit board from the motherboard.

17. The method of claim 13 further comprising:
operatively coupling the capacitive sense circuit board to of the first LED to activate the first LED to illuminate the first icon in accordance with the user functional input.

18. The method of claim 13 further comprising:
operatively coupling the capacitive sense circuit board to the first LED to deactivate the first LED to de-illuminate the first icon in accordance with an icon command instruction received at the capacitive sense circuit board from the processor.

19. The method of claim 13 further comprising:
operatively coupling the capacitive sense circuit board to the second LED to deactivate the second LED to de-illuminate the second icon in accordance with the user functional input.

20. A base chassis assembly for an information handling system allowing user replacement of touch-actuated icons and speaker comprising:
a base chassis top cover joined to a base chassis bottom cover to form the base chassis assembly housing a motherboard with a hardware processor, a memory, and a power source, where the base chassis assembly has an opening sized to receive a replaceable icon and speaker module to be operatively coupled to the motherboard via a connector disposed in the opening;
the replaceable icon and speaker module having a top acrylic layer forming an icon panel including a plurality of touch icon zones, each of the plurality of touch icon zones including a touch sensor and a first icon, where the first icon is formed from an etched first array of light prisms in the top acrylic layer bottom surface for a first icon touch zone;
the replaceable icon and speaker module having a second lower acrylic layer in the replaceable icon and speaker module having a second icon for the first touch icon zone, where the second icon is formed from an etched second array of light prisms in a second acrylic layer bottom surface;
the etched first array of light prisms having a refractive index for refracting visible light of the first color emitted from a first side-mounted light emitting diode (LED) at a first determined angle under the top acrylic layer bottom surface to illuminate the first icon in the first touch icon zone;
the second array of light prisms having a second refractive index for refracting visible light of a second color emitted from a second side-mounted LED at a second determined angle from the second lower acrylic layer bottom surface to illuminate the second icon in the first touch icon zone; and
a capacitive sense circuit board for sensing a first user touch at the touch sensor for the first touch icon zone and identifying a user function input associated with the first user touch based upon identification of the first icon or the second icon illuminated in the first touch icon zone.

* * * * *